US009881256B2

(12) United States Patent
Hamze et al.

(10) Patent No.: US 9,881,256 B2
(45) Date of Patent: Jan. 30, 2018

(54) SYSTEMS AND METHODS FOR PROBLEM SOLVING, USEFUL FOR EXAMPLE IN QUANTUM COMPUTING

(71) Applicant: D-Wave Systems Inc., Burnaby (CA)

(72) Inventors: Firas Hamze, Vancouver (CA); Andrew Douglas King, Vancouver (CA); Jack Raymond, Vancouver (CA); Aidan Patrick Roy, Surrey (CA); Robert Israel, Richmond (CA); Evgeny Andriyash, Vancouver (CA); Catherine McGeoch, Amherst, MA (US); Mani Ranjbar, Burnaby (CA)

(73) Assignee: D-WAVE SYSTEMS INC., Burnaby (CA)

( * ) Notice: Subject to any disclaimer, the term of this patent is extended or adjusted under 35 U.S.C. 154(b) by 0 days.

(21) Appl. No.: 15/505,522

(22) PCT Filed: Aug. 21, 2015

(86) PCT No.: PCT/US2015/046393
§ 371 (c)(1),
(2) Date: Feb. 21, 2017

(87) PCT Pub. No.: WO2016/029172
PCT Pub. Date: Feb. 25, 2016

(65) Prior Publication Data
US 2017/0255872 A1    Sep. 7, 2017

Related U.S. Application Data

(60) Provisional application No. 62/040,643, filed on Aug. 22, 2014, provisional application No. 62/040,646, (Continued)

(51) Int. Cl.
*H03K 19/195* (2006.01)
*G06N 99/00* (2010.01)
(Continued)

(52) U.S. Cl.
CPC ............. *G06N 99/002* (2013.01); *G06F 9/02* (2013.01); *G06F 9/32* (2013.01); *G06F 15/18* (2013.01);
(Continued)

(58) Field of Classification Search
CPC ...... H03K 19/195; G06N 99/002; G06N 3/12; G06F 9/02; G06F 15/18; G06F 15/76; G06F 9/32; G06F 17/10
See application file for complete search history.

(56) References Cited

U.S. PATENT DOCUMENTS 7,135,701 B2    11/2006 Amin et al.
7,303,276 B2    12/2007 Raymond
(Continued)

FOREIGN PATENT DOCUMENTS

WO    2014/123980 A1    8/2014

OTHER PUBLICATIONS

International Preliminary Report on Patentability, dated Feb. 28, 2017, for International Application No. PCT/US2015/046393, 5 pages.
(Continued)

*Primary Examiner* — Don Le
(74) *Attorney, Agent, or Firm* — Seed IP Law Group LLP

(57) ABSTRACT

Computational systems implement problem solving using heuristic solvers or optimizers. Such may iteratively evaluate a result of processing, and modify the problem or representation thereof before repeating processing on the modified problem, until a termination condition is reached. Heuristic solvers or optimizers may execute on one or more digital processors and/or one or more quantum processors. The system may autonomously select between types of hardware devices and/or types of heuristic optimization algorithms. Such may coordinate or at least partially overlap
(Continued)

post-processing operations with processing operations, for instance performing post-processing on an ith batch of samples while generating an (i+1)th batch of samples, e.g., so post-processing operation on the ith batch of samples does not extend in time beyond the generation of the (i+1)th batch of samples. Heuristic optimizers selection is based on pre-processing assessment of the problem, e.g., based on features extracted from the problem and for instance, on predicted success.

24 Claims, 15 Drawing Sheets

Related U.S. Application Data filed on Aug. 22, 2014, provisional application No. 62/040,661, filed on Aug. 22, 2014.

(51) Int. Cl.
 *G06N 3/12* (2006.01)
 *G06F 9/02* (2006.01)
 *G06F 15/18* (2006.01)
 *G06F 15/76* (2006.01)
 *G06F 9/32* (2006.01)
 *G06F 17/10* (2006.01)

(52) U.S. Cl.
 CPC .............. *G06F 15/76* (2013.01); *G06F 17/10* (2013.01); *G06N 3/12* (2013.01)

(56) References Cited

U.S. PATENT DOCUMENTS

| | | | |
|---|---|---|---|
| 7,418,283 | B2 | 8/2008 | Amin |
| 7,533,068 | B2 | 5/2009 | Maasen van den Brink et al. |
| 7,876,248 | B2 | 1/2011 | Berkley et al. |
| 8,008,942 | B2 | 8/2011 | van den Brink et al. |
| 8,035,540 | B2 | 10/2011 | Berkley et al. |
| 8,190,548 | B2 | 5/2012 | Choi |
| 8,195,596 | B2 | 6/2012 | Rose et al. |
| 8,421,053 | B2 | 4/2013 | Bunyk et al. |
| 2002/0184166 | A1 | 12/2002 | Jackson et al. |
| 2008/0313430 | A1 | 12/2008 | Bunyk |
| 2010/0185572 | A1 | 7/2010 | Bonabeau et al. |
| 2012/0254586 | A1 | 10/2012 | Amin et al. |
| 2013/0275351 | A1 | 10/2013 | Cantin |
| 2014/0223224 | A1 | 8/2014 | Berkley |
| 2015/0032993 | A1 | 1/2015 | Amin et al. |
| 2015/0032994 | A1 | 1/2015 | Chudak et al. |
| 2016/0328253 | A1* | 11/2016 | Majumdar ........... G06N 99/002 |
| 2017/0270245 | A1* | 9/2017 | van Rooyen ........... G06F 19/18 |

OTHER PUBLICATIONS

Hamze et al., "Systems and Methods for Problem Solving Via Solvers Employing Problem Modification," U.S. Appl. No. 62/040,643, filed Aug. 22, 2014, 80 pages.
Harris et al., "A Compound Josephson Junction Coupler for Flux Qubits With Minimal Crosstalk," *Phys. Rev. B. 80*(5): 052506, 2009. (5 pages).
Harris et al., "Experimental Investigation of an Eight-Qubit Unit Cell in a Superconducting Optimization Processor," *Phys. Rev. B. 82*(2): 024511, 2010. (16 pages).
Harris et al., "Experimental Demonstration of a Robust and Scalable Flux Qubit," *Phys. Rev. B. 81*(13): 134510, 2009. (20 pages).
International Search Report, dated Dec. 24, 2015, for International Application No. PCT/US2015/046393, 3 pages.
Lanting et al., "Systems and Methods for Improving the Performance of a Quantum Processor by Reducing Errors," U.S. Appl. No. 61/858,011, filed Jul. 24, 2013, 45 pages.
Lanting et al., "Systems and Methods for Improving the Performance of a Quantum Processor by Shimming to Reduce Intrinsic/Control Errors," U.S. Appl. No. 62/040,890, filed Aug. 22, 2014, 122 pages.
Ranjbar, "Systems and Methods for Problem Solving Via Solvers Employing Post-Processing That Overlaps With Processing," U.S. Appl. No. 62/040,646, filed Aug. 22, 2014, 84 pages.
Ranjbar, "Systems and Methods for Problem Solving Via Solvers Employing Selection of Heuristic Optimizer(S)," U.S. Appl. No. 62/040,661, filed Aug. 22, 2014, 88 pages.
Raymond, "Systems and Methods for Improving the Performance of a Quantum Processor Via Reduced Readouts," U.S. Appl. No. 62/048,043, filed Sep. 9, 2014, 101 pages.
Tavares, "New Algorithms for Quadratic Unconstrained Binary Optimization (QUBO) with Applications in Engineering and Social Sciences," Dissertation, Rutgers, The State University of New Jersey, May 2008, 460 pages.
Venugopal et al., "Dynamic Blocking and Collapsing for Gibbs Sampling," *Proceedings of the Twenty-Ninth Conference on Uncertainty in Artificial Intelligence*, 2013, 10 pages.
Written Opinion of the International Searching Authority, dated Dec. 24, 2015, for International Application No. PCT/US2015/046393, 4 pages.

\* cited by examiner

SYSTEMS AND METHODS FOR PROBLEM SOLVING, USEFUL FOR EXAMPLE IN QUANTUM COMPUTING

BACKGROUND

Field

This disclosure generally relates to computationally solving problems, and may particularly be useful in quantum computing via quantum processors.

Solvers

A solver is a mathematical-based set of instructions executed via hardware circuitry that is designed to solve mathematical problems. Some solvers are general purpose solvers, designed to solve a wide type or class of problems. Other solvers are designed to solve specific types or classes of problems. A non-limiting exemplary set of types or classes of problems includes: linear and non-linear equations, systems of linear equations, non-linear systems, systems of polynomial equations, linear and non-linear optimization problems, systems of ordinary differential equations, satisfiability problems, logic problems, constraint satisfaction problems, shortest path or traveling salesperson problems, minimum spanning tree problems, and search problems.

There are numerous solvers available, most of which are designed to execute on classical computing hardware, that is computing hardware that employs digital processors and/or digital processor-readable nontransitory storage media (e.g., volatile memory, non-volatile memory, disk based media). More recently, solvers designed to execute on non-classical computing hardware are becoming available, for example solvers designed to execute on analog computers, for instance an analog computer including a quantum processor.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is given by:

$$H_e = (1-s)H_i + sH_f \quad (0a)$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can transition to a higher energy state, such as the first excited state. Generally, an "adiabatic" evolution is considered to be an evolution that satisfies the adiabatic condition:

$$\dot{s}\langle 1|dH_e/ds|0\rangle = \delta g^2(s) \quad (0b)$$

where $\dot{s}$ is the time derivative of s, g(s) is the difference in energy between the ground state and first excited state of the system (also referred to herein as the "gap size") as a function of s, and δ is a coefficient much less than 1. Generally the initial Hamiltonian $H_i$ and the final Hamiltonian $H_f$ do not commute. That is, $[H_i, H_f] \neq 0$.

The process of changing the Hamiltonian in adiabatic quantum computing may be referred to as evolution. The rate of change, for example, change of s, is slow enough that the system is always in the instantaneous ground state of the evolution Hamiltonian during the evolution, and transitions at anti-crossings (i.e., when the gap size is smallest) are avoided. The example of a linear evolution schedule is given above. Other evolution schedules are possible including non-linear, parametric, and the like. Further details on adiabatic quantum computing systems, apparatus, and methods are described in, for example, U.S. Pat. Nos. 7,135,701 and 7,418,283.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, to reach a global energy minimum more accurately and/or more quickly than classical annealing. In quantum annealing thermal effects and other noise may be present to aid the annealing. However, the final low-energy state may not be the global energy minimum. Adiabatic quantum computation, therefore, may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces quantum effects by adding a disordering Hamiltonian $H_D$ that does not commute with $H_P$. An example case is:

$$H_E \propto A(t)H_D + B(t)H_P, \quad (0c)$$

where A(t) and B(t) are time dependent envelope functions. The Hamiltonian $H_E$ may be thought of as an evolution Hamiltonian similar to $H_e$ described in the context of adiabatic quantum computation above. The delocalization may be removed by removing $H_D$ (i.e., reducing A(t)). The delocalization may be added and then removed. Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem but the system does not necessarily stay in the ground state at all times. The energy landscape of $H_P$ may be crafted so that its global minimum is the answer to the problem to be solved, and low-lying local minima are good approximations.

Persistent Current

A superconducting flux qubit (such as a radio frequency superconducting quantum interference device; "rf-SQUID") may comprise a loop of superconducting material (called a "qubit loop") that is interrupted by at least one Josephson junction. Since the qubit loop is superconducting, it effectively has no electrical resistance. Thus, electrical current traveling in the qubit loop may experience no dissipation. If an electrical current is coupled into the qubit loop by, for example, a magnetic flux signal, this current may continue to circulate around the qubit loop even when the signal source is removed. The current may persist indefinitely until it is interfered with in some way or until the qubit loop is no longer superconducting (due to, for example, heating the qubit loop above its critical temperature). For the purposes of this specification, the term "persistent current" is used to describe an electrical current circulating in the qubit loop of a superconducting qubit. The sign and magnitude of a persistent current may be influenced by a variety of factors, including but not limited to a flux signal $\varphi_X$ coupled directly into the qubit loop and a flux signal $\varphi_{CJJ}$ coupled into a compound Josephson junction that interrupts the qubit loop.

Quantum Processor

A quantum processor may take the form of a superconducting quantum processor. A superconducting quantum processor may include a number of qubits and associated local bias devices. A superconducting quantum processor may also employ couplers to provide tunable communicative connections between qubits. A qubit and a coupler resemble each other but differ in physical parameters. One difference is the parameter, $\beta$. Consider an rf-SQUID, superconducting loop interrupted by a Josephson junction, $\beta$ is the ratio of the inductance of the Josephson junction to the geometrical inductance of the loop. A design with lower values of $\beta$, about 1, behaves more like a simple inductive loop, a monostable device. A design with higher values is more dominated by the Josephson junctions, and is more likely to have bistable behavior. The parameter, $\beta$ is defined a $2\pi LI_C/\Phi_0$. That is, $\beta$ is proportional to the product of inductance and critical current. One can vary the inductance, for example, a qubit is normally larger than its associated coupler. The larger device has a larger inductance and thus the qubit is often a bistable device and a coupler monostable. Alternatively the critical current can be varied, or the product of the critical current and inductance can be varied. A qubit often will have more devices associated with it. Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

Many techniques for using quantum annealing to solve computational problems involve finding ways to directly map/embed a representation of a problem to the quantum processor. Generally, a problem is solved by first casting the problem in a contrived formulation (e.g., Ising spin glass, QUBO, etc.) because that particular formulation maps directly to the particular embodiment of the quantum processor being employed. A QUBO with N variables, or spins $s\in[-1, +1]$, may be written as a cost function of the form:

$$E(s) = \sum_i^N h_i s_i + \sum_{i<j} J_{ij} s_i s_j, \qquad (1)$$

where $h_i$ and $J_{ij}$ are dimensionless quantities that specify a desired Ising spin glass instance. Solving this problem involves finding the spin configuration $s_i$ that minimizes E for the particular set of $h_i$ and $J_{ij}$ provided. In some implementations, the allowed range of $h_i \in [-2, 2]$ and $J_{ij} \in [-1, 1]$. For reasons described later, the $h_i$ and $J_{ij}$ are not perfectly represented on the hardware during optimization. These misrepresentations may be defined as control errors:

$$h_i \rightarrow h_i \pm \delta h_i \qquad (2a)$$

$$J_{ij} \rightarrow J_{ij} \pm \delta J_{ij} \qquad (2b)$$

Control errors $\delta h$ and $\delta J$ arise from multiple sources. Some sources of error are time dependent and others are static, but depend on a particular suite of h and J values.

Intrinsic/Control Error (ICE)

A quantum processor may implement a time-dependent Hamiltonian of the following form:

$$\frac{\mathcal{H}(t)}{\mathcal{J}_{AFM}(t)} = -\sum_i h_i \sigma_z^{(i)} + \sum_{i,j>i} J_{ij} \sigma_z^{(i)} \sigma_z^{(j)} - \sum_i \Gamma_i(t) \sigma_x^{(i)} \qquad (3a)$$

where $\Gamma_i(t)$ is a dimensionless quantity describing the amplitude of the single spin quantum tunneling, and $\mathcal{J}_{AFM}(t)$ is an overall energy scale. Equation 3a is the desired or target Hamiltonian. Quantum annealing is realized by guiding the system through a quantum phase transition from a delocalized ground state at t=0, subject to $\Gamma_i(t=0) \gg h_i$, $J_{ij}$, to a localized spin state at $t=t_f$, subject to $\Gamma_i(t_f) \ll h_i$, $J_{ij}$. Further details concerning this evolution can be found in Harris et al., Experimental investigation of an eight-qubit unit cell in a superconducting optimization processor, Phys. Rev. B, Vol. 82, Issue 2, 024511, 2010 ("Harris 2010b"). The Hamiltonian given by equation 3a may be implemented on quantum annealing processors using networks of inductively coupled superconducting flux qubits and couplers as described in, for example Harris et al., Compound Josephson-junction coupler for flux qubits with minimal crosstalk, Phys. Rev. B, Vol. 80, Issue 5, 052506, 2009 ("Harris 2009") and Harris et al., Experimental demonstration of a robust and scalable flux qubit, Phys. Rev. B, Vol. 81, Issue 13, 134510 ("Harris 2010a"). As described in Harris 2010b, the dimensionless parameters $h_i$, $J_{ij}$, and $\Gamma_i(t)$ map onto physical device parameters in the following manner:

$$h_i = \frac{|I_i^p(t)|(\Phi_i^x(t) - \Phi_i^0)}{\mathcal{J}_{AFM}(t)} \qquad (3b)$$

$$J_{ij} = \frac{M_{ij}|I_i^p(t)||I_j^p(t)|}{\mathcal{J}_{AFM}(t)} \qquad (3c)$$

$$\Gamma_i(t) = \frac{\Delta_i(t)}{2\mathcal{J}_{AFM}(t)} \qquad (3d)$$

where $\Phi_i^x(t)$ is a time-dependent flux bias applied to a qubit i, $\Phi_i^0$ is the nominally time-independent degeneracy point of qubit i, and $M_{ij}$ is the effective mutual inductance provided by the tunable interqubit coupler between qubits i and j. The time-dependent quantities $|I_i^p(t)|$ and $\Delta_i(t)$ correspond to the magnitude of the qubit persistent current and tunneling energy, respectively, of qubit i. Averages of these quantities across a processor are indicated by $|I_i^p(t)|$ and $\Delta_i(t)$. The global energy scale $\mathcal{J}_{AFM}(t) \equiv M_{AFM}|I_i^p(t)|$ given by the Hamiltonian in equation 3a has been defined in terms of the average qubit persistent current $|I_i^p(t)|$ and the maximum antiferromagnetic (AFM) mutual inductance $M_{AFM}$ that can be achieved by all couplers across a processor.

Quantum annealing implemented on a quantum processor aims to realize time-independent $h_i$ and $J_{ij}$. Equation 3c naturally yields a time-independent quantity upon substituting the definition of $J_{AFM}(t)$ and assuming that:

$$|I_i^p(t)|=|I^p(t)|=|I_q^p(t)|.$$

In order to expunge the time-dependence from $h_i$ in Equation 3b, subject to the assumption that:

$$|I_i^p(t)|=|I_q^p(t)|,$$

time-dependent flux bias applied to the i-th qubit $\Phi_i^x(t)$ of the form:

$$\Phi_i^x(t)=M_i\alpha|I_q^p(t)|+\Phi_i^0 \quad (3e)$$

should be applied where $\alpha|I_q^p(t)|$ represents an externally supplied bias current that emulates the evolution of the qubit persistent current $|I_q^p(t)|$ multiplied by a dimensionless factor $\alpha_{\gg} 1$ and $M_i \equiv h_i M_{AFM}/\alpha$ is the effective mutual inductance between the aforementioned external current bias and the body of qubit i. The logic leading to equation 3e and its implementation in hardware is discussed in detail in Harris 2010b.

Equations 3a-3e link the dimensionless user-specified quantities $h_i$ and $J_{ij}$ that define an Ising spin glass instance to the physical properties of qubits and couplers. These hardware elements are subject to practical constraints, both in design and fabrication that ultimately limit the amount of control that the user can exert on the Ising spin glass parameters $h_i$ and $J_{ij}$. The term Intrinsic/Control Error (ICE) defines the resolution to which one $h_i$ and $J_{ij}$ can be realized on a quantum processor (i.e., chip). Sources of error can be classified based on whether those sources or error are due to some intrinsic non-ideality of a particular device on a chip or whether they are due to the finite resolution of some control structure. Arguably, the resolution to which $\Gamma_i$ can be controlled could have significant bearing on the efficacy of quantum annealing. For the purpose of the present systems and methods, it is assumed that all $\Gamma_i(t)$ are identical.

The impact of ICE can be characterized by modifying the definitions of $h_i$ and $J_{ij}$ given above to include physical sources of error:

$$h_i \to \frac{(|I_q^p(t)|+\delta|I_i^p(t)|)(\Phi_i^x(t)-\Phi_i^0-\delta\Phi_i^0)}{\mathcal{J}_{AFM}(t)} \quad (4a)$$

$$J_{ij} \to \frac{(M_{ij}+\delta M_{ij})(|I_q^p(t)|+\delta|I_i^p(t)|)(|I_q^p(t)|+\delta|I_j^p(t)|)}{\mathcal{J}_{AFM}(t)} \quad (4b)$$

$$\Phi_i^x(t) \to (M_i+\delta M_i)\alpha|I_q^p(t)|+\Phi_i^0 \quad (4c)$$

where the assumption is that the global variables $M_{AFM}$, $|I_q^p(t)|$, and $\alpha$ have been calibrated to high precision. A sparse network of analog control lines that allow for high precision one- and two-qubit operations can be used in order to calibrate these quantities. Thus, $\delta|I_i^p(t)|$, $\delta|I_j^p(t)|$, $\delta\Phi_i^0$, $\delta M_i$, and $\delta M_{ij}$, represent the perturbations that give rise to errors in $h_i$ and $J_{ij}$. Generally, these perturbations are small and so therefore may be neglected in the present systems and methods so that only the errors in $h_i$ and $J_{ij}$ that are first order are taken into consideration.

If the deviations in the qubit persistent current $\delta|I_i^p(t)|\neq 0$ and $\delta|I_j^p(t)|\neq 0$ and if all other deviations are set to zero, recalling that in the ideal case $M_i = h_i^* M_{AFM}/\alpha$ and $M_{ij} = J_{ij}^* M_{AFM}$, substituting equation 4c into equation 4a and 4b then yields errors in the instance parameters of the following form:

$$\delta h_i = h_i \frac{\delta|I_i^p(t)|}{|I_q^p(t)|} \quad (5a)$$

$$\delta J_{ij} = J_{ij}\sqrt{\left[\frac{\delta|I_i^p(t)|}{|I_q^p(t)|}\right]^2 + \left[\frac{\delta|I_j^p(t)|}{|I_q^p(t)|}\right]^2} \to J_{ij}2\frac{\delta|I_i^p(t)|}{|I_q^p(t)|} \quad (5b)$$

where the assumption in the formula for $\delta J_{ij}$ is the absolute worst-case scenario in which the deviations of the two persistent currents are correlated and equal in magnitude.

Deviations in the mutual inductance $\delta M_i \neq 0$, with all others set to zero, only affect $h_i$. Substituting equation 4c into equation 4a yields:

$$\delta h_i = \frac{\delta M_i}{M_{AFM}/\alpha} \quad (5c)$$

Likewise, deviations of the qubit degeneracy point $\delta\Phi_i^0$, with all others set to zero, also only affect $h_i$. Substituting equation 4c into equation 4a yields a time dependent error:

$$\delta h_i = \frac{\delta\Phi_i^0}{M_{AFM}|I_q^p(t)|}. \quad (5d)$$

Finally, deviations in interqubit coupling mutual inductance $\delta M_{ij}$, with all others set to zero, only affect $J_{ij}$ as shown below:

$$\delta J_{ij} = \frac{\delta M_{ij}}{M_{AFM}}. \quad (5e)$$

It is worth noting that deviations in the qubit persistent current $\delta|I_i^p(t)|\neq 0$ and $\delta|I_j^p(t)|\neq 0$ lead to relative errors in the problem instance settings, as given by equations 5a and 5b. In contrast, deviations in mutual inductances and flux offsets lead to absolute errors. One convention defines the allowed range of problem instance specifications to be $-1 \leq h_i$, $J_{ij} \leq 1$. For relative errors, an upper bound on an absolute error is realized if $|h_i|=|J_{ij}|=1$.

Equations 5a to 5e produce absolute errors (or upper bounds on absolute errors) as a function of perturbations in qubit persistent current $\delta|I_i^p(t)|$, qubit degeneracy point $\delta\Phi_i^0$, mutual inductance $\delta M_i$, and interqubit coupling $\delta M_{ij}$. Identifying the physical mechanisms that give rise to these four quantities and studying worst-case scenarios under which those mechanisms give rise to ICE may help reduce such errors.

Performance Metrics

As in common with optimization heuristics, whether quantum or classical, performance can be characterized by a trade-off between computation time and solution quality. More time generally yields better solutions. A performance metric can be used to quantify performance of a method.

One performance metric is STS (samples to solution) and is the expected number of samples to reach an optimal solution. It can also be expressed as TTS (time to solution) where the number of samples is multiplied by the time to generate each sample.

Another performance metric is STE (samples to epsilon) and is the expected number of samples to reach a solution energy within a distance $\epsilon$ of optimal. TTE (time to epsilon) is obtained by multiplying sample time by the samples to epsilon.

A third metric is TTT (time to target). When quantum annealers are used to solve NP-hard optimization problems, for example, computation of the optimal cost is not always feasible. An advantage of TTT is that it does not require knowledge of optimal solutions. In one approach, the convergence of minimum sample energies is compared for two solvers.

BRIEF SUMMARY

There exists a need to be able to generate solutions or possible solutions to a large variety of problems, and to do so in a time efficient and computational cost efficient manner. Selecting an appropriate solver for a particular problem or class of problems can be difficult and time intensive, as can be selecting the most appropriate hardware. Automated approaches which provide access to a variety of solvers and hardware are desirable.

Computational systems are described which, at least in some implementations, may be used to provide services, accessed remotely via a simple interface (e.g., application programming interface (API) or Web-based user interface) for problem solving using a variety of solvers implemented via a variety of algorithms executing on a variety of hardware (e.g., processors). The interface takes as input, for example, any of the following: any QUBO matrix Q, a flag specifying whether optimization or Boltzmann sampling is desired, and a set of parameters for expert users. The interface may also take as input a problem formulated as a satisfiability (SAT) problem, a graphical model (GM) or a quadratic assignment problem (QAP). The interface returns as output a best solution.

The computational systems may include a large variety of algorithms for solving optimization and sampling over QUBOs. The computational systems may run or execute the various algorithms, for example in parallel, and use the best answers returned from two or more solver algorithms. The computational systems may include both superconducting or quantum hardware as well as classical, non-superconducting or non-quantum hardware. The computational systems typically pre-process problems, and post-process the results of the processing of the problems by the solvers. This approach may provide quality solutions in a cost efficient manner.

The computational systems, devices, articles and/or methods described herein are a hybrid solution, leveraging various technologies and creating new types of hybrid algorithms. This approach employs highly suitable solvers and hardware, including classical or non-quantum computation and quantum computation. For example, a tabu search run using field programmable gate arrays (FPGAs) may be much faster than a tabu search run on standard microprocessors. This approach may additionally or alternatively employ pre- and post-processing of results using proprietary and/or non-proprietary methods using classical and/or quantum computing hardware. Additionally, the computational systems may, for certain tasks, pass computation to cloud resources available elsewhere, such as Amazon Web Services (AWS) or GPU clusters, if an appropriate or optimum architecture for a particular problem is provided by such a set up. The computational systems, devices, articles and/or methods described herein may be operated as a software-as-a-service (SaaS) delivery mechanism.

A method of operation in a computational system, may be summarized as including: receiving a problem and performing a number of iterations i to a number n where n is a positive integer. Each iteration includes causing a solver to be executed by at least one processor to generate a plurality of samples as potential solutions to the problem; causing, by at least one controller, a performing of at least one post-processing operation on the plurality of samples by at least one post-processing non-quantum processor-based device to generate a set of post-processing results; and determining whether to modify the problem based at least in part on the set of post-processing results. Upon determining to modify the problem based at least in part on the set of post-processing results, the ith iteration further includes causing the problem to be modified and initiating an (i+1)th iteration.

Causing the solver to be executed by at least one processor to generate a plurality of samples as potential solutions to the problem may include causing the problem to be optimized by at least one heuristic optimizer executed by at least one processor to generate a plurality of samples as potential solutions to the problem.

Determining whether to modify the problem based at least in part on the set of post-processing results may include comparing a result to a determined satisfaction condition and/or comparing the number of iterations performed to a determined limit.

In some implementations of the above-described method, the at least one processor is a non-quantum processor comprising at least one non-quantum processor such as at least one of: a microprocessor, a digital signal processor (DSP), a graphical processing unit (GPU), a field programmable gate array (FPGA), and an Application Specific Integrated Circuit (ASIC).

In some implementations of the above-described method of operation in a computational system, the at least one processor is a quantum processor.

In any of the above described embodiments of the method of operation in a computational system, causing a performing of at least one post-processing operation by at least one non-quantum processor-based device may include causing a performing of the at least one post-processing operation by at least one of a microprocessor, a digital signal processor (DSP), a graphical processing unit (GPU), a field programmable gate array (FPGA), and an Application Specific Integrated Circuit (ASIC). Furthermore, causing a performing of at least one post-processing operation by at least one non-quantum processor-based device may include causing a performing of at least one of: a majority voting post-processing operation, a greedy descent post-processing operation, a variable clamping post-processing operation, a variable branching post-processing operation, a local field voting post-processing operation, a local search to find a local minimum post-processing operation, a Markov Chain Monte Carlo simulation at a fixed temperature post-processing operation, and a Metropolis sampling post-processing operation, by at least one digital processor.

In some implementations of the above-described method of operation in a computational system, different heuristic optimizers may be used for different iterations. For example, on a first iteration the problem is optimized by a first heuristic optimizer executed by at least one processor, and on a second iteration the problem by a second heuristic optimizer executed by at least one processor, wherein the second heuristic optimizer is different from the first heuristic optimizer. The method of operation in a computational system may include: autonomously selecting, by at least one component of the computational system, between a plurality of types of hardware devices to perform the heuristic optimization. The method of operation in a computational system may include: autonomously selecting, by at least one component of the computational system, between a plurality of types of heuristic optimization algorithms to perform the heuristic optimization.

The method of operation in a computational system may further include sending one or more results from the set of post-processing results to a user by at least one component of the computational system.

In some embodiments of the method of operation in a computational system, n is an integer greater than 2, and the performing of at least one post-processing operation on the ith plurality of samples by the at least one post-processing non-quantum processor-based device to generate the ith set of post-processing results occurs at least partially overlapping in time with the optimization by at least one heuristic optimizer executed by at least one processor to generate the (i+1)th plurality of samples, for values of i between 2 and (n−1). In some cases, the performing of the at least one post-processing operation on the ith plurality of samples to generate the ith set of post-processing results does not extend in time beyond the optimization by at least one heuristic optimizer to generate the (i+1)th plurality of samples. In some cases, the duration of the performing of the at least one post-processing operation on the ith plurality of samples to generate the ith set of post-processing results is less than the duration of the optimization by at least one heuristic optimizer to generate the (i+1)th plurality of samples. The duration of the optimization by at least one heuristic optimizer to generate the plurality may vary for different iterations. For example, the duration of the optimization by at least one heuristic optimizer to generate the (i+1)th plurality of samples may be different from the duration of the optimization by at least one heuristic optimizer to generate the ith plurality of samples.

In the method of operation in a computational system, where n is an integer greater than 2, for iterations having values of i between 2 and (n−1), the method may further include determining a timing of the optimization by at least one heuristic optimizer executed by at least one processor to generate the (i+1)th plurality of samples, and the performing of at least one post-processing operation on the ith plurality of samples by the at least one post-processing non-quantum processor-based device to generate the ith set of post-processing results may occur at least partially overlapping in time with the optimization by at least one heuristic optimizer executed by at least one processor to generate the (i+1)th plurality of samples. Determining a timing of the optimization by at least one heuristic optimizer may include, for example, determining at least one of a start time, an end time, and a duration of the optimization by at least one heuristic optimizer to generate the (i+1)th plurality of samples. The method may include determining a timing of the performing of the at least one post-processing operation on the ith plurality of samples by the at least one post-processing non-quantum processor-based device to generate the ith set of post-processing results. Determining a timing of the performing of the at least one post-processing operation on the ith plurality of samples to generate the ith set of post-processing results may include, for example, determining at least one of a start time, an end time, and a duration of the performing of the at least one post-processing operation on the ith plurality of samples.

In some embodiments of the method of operation in a computational system, the method further includes: performing a pre-processing assessment of the problem by a processor-based device; and selecting, by the processor-based device, the at least one heuristic optimizer from a plurality of heuristic optimizers based at least in part on the pre-processing assessment of the problem. Receiving the problem may include determining a format of the problem; and determining whether the determined format of the problem is a supported format. In response to determining that the determined format of the problem is not supported, the method may further include rejecting the problem and providing a notification of the rejection of the problem to a user by at least one component of the computational system. In response to the format of the problem being supported, the method may further include generating a plurality of representations of the problem by the processor-based device. For each of the representations of the problem, the method may include extracting a number of features from the problem; assessing and/or evaluating each of a plurality of heuristic optimizers based at least in part on the extracted features; selecting one or more heuristic optimizers based on at least one of the evaluation or the assessment by the processor-based device; and causing the selected one or more heuristic optimizers to operate on the problem. Selecting one or more heuristic optimizers based on the evaluation by the processor-based device may include autonomously selecting one or more heuristic optimizers based on at least one of the assessment or the evaluation by the processor-based device. Evaluating each of a plurality of heuristic optimizers based at least in part on the extracted features may include predicting how successful each of the heuristic optimizers of the plurality of heuristic optimizers would be in returning an optimal solution for the problem using the extracted features. In some cases, at least two heuristic optimizers are selected, and the at least two heuristic optimizers are different from one another. The method may further include comparing the results from each of the selected at least two different heuristic optimizers, and determining a preferred solution based at least in part on the comparison. The method may further include comparing the final result for the problem for each of the selected at least two different heuristic optimizers, and determining a preferred solution based at least in part on the comparison. The method may further include, for each of the selected heuristic optimizers, splitting the problem into a number of portions; distributing the portions to respective ones of a plurality of computational resources; gathering the results for each portion of the problem; and generating a final result for the problem for the heuristic optimizer based on the results from the portions. Distributing the portions to respective ones of a plurality of computational resources may include distributing the portions based on a type of processing required by the respective portion of the problem.

A computational system, may be summarized as including: at least one processor-based controller, the at least one processor-based controller communicatively coupled to at least one heuristic optimizer which in operation for each of one or more iterations generates a plurality of samples as potential solutions of a problem. The at least one heuristic optimizer is executed by at least one processor. The at least one processor-based controller is operatively coupled to at least one non-quantum post-processing processor-based device. The at least one processor-based controller in use for each of the one or more iterations: causes an execution of at least one post-processing operation on the plurality of samples by the at least one post-processing processor-based device to generate a set of post-processing results; determines whether to modify the problem based at least in part on the set of post-processing results; and upon determining to modify the problem based at least in part on the set of post-processing results, causes the problem to be modified and initiates a further iteration.

The at least one processor-based controller may cause the iterations to cease for the problem in response to determining the result meets a determined satisfaction condition and/or the number of iterations equals a determined limit.

In some implementation of the computational system, the at least one processor that executes the heuristic optimizer is a quantum processor. The at least one non-quantum post-processing processor-based device may be at least one of a microprocessor, a digital signal processor (DSP), a graphical processing unit (GPU), a field programmable gate array (FPGA), and an Application Specific Integrated Circuit (ASIC). The computational system may further comprise at least one digital processor caused by the at least one processor-based controller to perform at least one of: a majority voting post-processing operation, a greedy descent post-processing operation, a variable clamping post-processing operation, a variable branching post-processing operation, or a local field voting post-processing operation. The computational system may comprise a server (e.g., server hardware), communicatively coupled to the quantum processor, wherein the processor-based controller in use causes the server to send one or more results from the set of post-processing results to a user. The at least one heuristic optimizer may include a first optimizer caused by the at least one processor-based controller of the computational system to optimize the problem on a first iteration, and a second heuristic optimizer, different from the first heuristic optimizer, caused by the at least one processor-based controller of the computational system to optimize the problem on a second iteration. The computational system may comprise a plurality of hardware devices, one of the plurality of hardware devices selected by the at least one processor-based controller to perform heuristic optimization.

In some embodiments of the above-described computational system, the at least one processor-based controller in use for at least one of the one or more iterations causes the execution of the at least one post-processing operation on the plurality of samples by the at least one post-processing processor-based device to generate a set of post-processing results to at least partially overlap in time with the generation of an immediately subsequent plurality of samples by at least one heuristic optimizer.

A computational system, may be summarized as including: at least one processor-based device which includes at least one processor, and at least one nontransitory processor-readable medium communicatively coupled to the at least one processor. The at least one nontransitory processor-readable medium stores at least one of processor-executable instructions or data. The at least one nontransitory processor-readable medium, when executed by the at least one processor, causes the at least one processor, for each of a number of problems to: perform a pre-processing assessment of the problem by a processor-based device; select, by the processor-based device, at least one heuristic optimizer from a plurality of heuristic optimizers based at least in part on the pre-processing assessment of the problem; and cause the problem to be optimized by the at least one selected heuristic optimizer. In some implementations the at least one processor is a quantum processor. The at least one processor-based device may be a non-quantum processor-based device. The non-quantum processor-based device may be at least one of a microprocessor, a digital signal processor (DSP), a graphical processing unit (GPU), a field programmable gate array (FPGA), and an Application Specific Integrated Circuit (ASIC).

A method of operation in a computational system may be summarized as including: for each of a number of problems and for each of a plurality of samples produced as results to respective ones of the number of problems by at least one heuristic optimizer executed via at least one processor: causing, by at least one controller, a performing at least one post-processing operation on the respective samples via at least one post-processing non-quantum processor-based device; determining whether to modify the original problem based at least in part on the results of the post-processing; for at least one iteration of at least one problem, modifying the problem; and causing the modified problem to be optimized via one of the heuristic optimizers.

Determining whether to modify the original problem based at least in part on the results of the post-processing may include determining if a satisfaction condition is reached.

The method of operation in a computational system may further include determining whether a maximum number of iterations of modifying the problem has been reached; and ceasing modifying the problem in response to determining that the maximum number of iterations has been reached.

The heuristic optimizer may be executed by a quantum processor, and may further include receiving the samples generated via the heuristic optimization executed by the quantum processor. The heuristic optimizer may be executed via at least one non-quantum processor selected from at least one of a microprocessor, a digital signal processor (DSP), a graphical processing unit (GPU), or a field programmable gate array (FPGA), and may further include receiving the samples generated via the heuristic optimization executed by the at least one of the microprocessor, the DSP, the GPU, or FPGA. Causing a performing of at least one post-processing operation via at least one non-quantum processor-based device may include causing the at least one post-processing operation via at least one of a microprocessor, a digital signal processor (DSP), a graphical processing unit (GPU), or a field programmable gate array (FPGA). Causing a performing of at least one post-processing operation via at least one processor-based device may include causing at least one of: a majority voting post-processing operation, a greedy descent post-processing operation, a variable clamping post-processing operation, a variable branching post-processing operation, or a local field voting post-processing operation, via at least one digital processor. The computational system may include the at least one processor that executes the heuristic optimizer, and may further include performing the heuristic optimization on the respective problem by the at least one processor. The computational system may include the at least one processor that executes the heuristic optimizer in the form of at least one non-quantum processor selected from at least one of a microprocessor, a digital signal processor (DSP), a graphical processing unit (GPU), or a field programmable gate array (FPGA), and may further include performing the heuristic optimization on the respective problem by the at least one non-quantum processor. The computational system may include the at least one processor that executes the heuristic optimizer in the form of at least one quantum processor, and may further include performing the heuristic optimization on the respective problem by the at least one quantum processor. Causing the modified problem to be optimized via one of the heuristic optimizers may include using a first one of the heuristic optimizers to optimize the respective problem and using a second one of the heuristic optimizers to optimize the modified problem, the second one of the heuristic optimizers different than the first one of the heuristic optimizers.

The method of operation in a computational system may further include switching between the heuristic optimizers between iterations on at least one of the problems.

The method of operation in a computational system may further include autonomously selecting, by at least one component of the computational system, between a plurality of types of hardware devices to perform the heuristic optimization.

The method of operation in a computational system may further include autonomously selecting, by at least one component of the computational system, between a plurality of types of heuristic optimization algorithms to perform the heuristic optimization.

A computational system may be summarized as including: at least one processor-based controller, the at least one processor-based controller communicatively coupled to at least one heuristic optimizer which in operation generates samples as potential solutions of problems, the at least one processor-based controller operatively coupled to at least one post-processing processor-based device, the at least one processor-based controller which in use: for each of a number of problems and for each of a plurality of samples produced as potential solutions to respective ones of the number of problems by a heuristic optimizer executed via at least one processor: causes an execution of at least one post-processing operation on the respective samples via the at least one post-processing processor-based device; determines whether to modify the original problem based at least in part on the results of the post-processing; for at least one iteration for at least one problem, modifies the problem; and causes the modified problem to be optimized via one of the heuristic optimizers.

The at least one processor-based controller may determine if a satisfaction condition is reached in order to determine whether to modify the original problem based at least in part on the results of the post-processing. The at least one processor-based controller may further: determine whether a maximum number of iterations of modifying the problem has been reached; and cause the iterations to cease for the respective problem in response to the maximum number of iterations having been reached. The heuristic optimizer may be executed by a quantum processor, and the at least one processor-based controller may further receive the samples generated via the heuristic optimization executed by the quantum processor. The heuristic optimizer may be executed via at least one non-quantum processor selected from at least one of a microprocessor, a digital signal processor (DSP), a graphical processing unit (GPU), or a field programmable gate array (FPGA), and the at least one processor-based controller may further receive the samples generated via the heuristic optimization executed by the at least one of the microprocessor, the DSP, the GPU, or FPGA. The at least one processor-based controller may cause the at least one post-processing operation via at least one of a microprocessor, a digital signal processor (DSP), a graphical processing unit (GPU), or a field programmable gate array (FPGA). The at least one processor-based controller may cause at least one of: a majority voting post-processing operation, a greedy descent post-processing operation, a variable clamping post-processing operation, a variable branching post-processing operation, or a local field voting post-processing operation, via at least one digital processor. The computational system may include the at least one processor that executes the heuristic optimizer and the at least one processor may perform the heuristic optimization on the respective problem by the at least one processor. The computational system may include the at least one processor that executes the heuristic optimizer in the form of at least one non-quantum processor selected from at least one of a microprocessor, a digital signal processor (DSP), a graphical processing unit (GPU), or a field programmable gate array (FPGA), and the at least one non-quantum processor may perform the heuristic optimization on the respective problem. The computational system may include the at least one processor that executes the heuristic optimizer in the form of at least one quantum processor. The at least one processor-based controller of the computational system may cause a first one of the heuristic optimizers to optimize the respective problem and a second one of the heuristic optimizers to optimize the modified problem, the second one of the heuristic optimizers different than the first one of the heuristic optimizers. The at least one processor-based controller of the computational system may further switch between the heuristic optimizers between iterations on at least one of the problems. At least one processor-based controller of the computational system may autonomously select between a plurality of types of hardware devices to perform the heuristic optimization. At least one processor-based controller of the computational system may autonomously select between a plurality of types of heuristic optimization algorithms to perform the heuristic optimization.

A method, system, and computer readable instructions for solving a problem using an analog computer including a quantum processor including a plurality of qubits and associated devices may be summarized as comprising initializing the quantum processor in a first configuration embodying an initialization Hamiltonian; evolving the quantum processor for a time T so it is described by a second configuration approximating a problem Hamiltonian; and reading out a state of the quantum processor; storing the state in a computer-readable medium, A method of operation in a computational system that includes at least one processor-based controller communicatively coupled to at least one quantum processor which in operation generates batches of samples and operatively coupled to at least one post-processing processor-based device may be summarized as including: for a plurality of iterations i from 1 to a number n, where n is an integer greater than 2: determining a timing of a generation of an (i+1)th batch of samples generated by at least one quantum processor; and causing execution of at least one post-processing operation via the at least one post-processing processor-based device on the ith batch of samples, where the at least one post-processing operation on the ith batch of samples occurs at least partially overlapping in time with a generation of an (i+1)th batch of samples for iterations between a first iteration and a last iteration, non-inclusive of the first iteration and the last iteration.

Causing the execution of the at least one post-processing operation may include causing the execution of the at least one post-processing operation timed such that the at least one post-processing operation on the ith batch of samples does not extend in time beyond the generation of the (i+1)th batch of samples for iterations between the first iteration and the last iteration, non-inclusive of the first iteration and the last iteration. Determining the timing of the generation of the (i+1)th batch of samples generated by the at least one quantum processor may include determining by the processor-based controller that the (i+1)th batch of samples has been generated by the at least one quantum processor.

Determining the timing of the generation of the (i+1)th batch of samples generated by the at least one quantum processor may include determining by the processor-based controller that the ith batch of samples has been generated by the at least one quantum processor.

The method of operation in a computational system that includes at least one processor-based controller communicatively coupled to at least one quantum processor which in operation generates batches of samples and operatively coupled to at least one post-processing processor-based device may further include, for the plurality of iterations i from 1 to the number n, receiving the ith batch of samples generated by at least one quantum processor by the processor-based controller and determining the timing of the generation of the (i+1)th batch of samples generated by the at least one quantum processor based at least in part on receipt of the ith batch of samples generated by the at least one quantum processor.

Determining the timing of the generation of the (i+1)th batch of samples generated by the at least one quantum processor may include determining the timing of the generation of the (i+1)th batch of samples generated by the at least one quantum processor based at least in part on receipt of the ith batch of samples by at least one component of the computational system other than the processor-based controller. Determining the timing of the generation of the (i+1)th batch of samples generated by the at least one quantum processor may include determining the timing of the generation of the (i+1)th batch of samples generated by the at least one quantum processor based at least in part on a transmission of at least one signal that causes the generation of the (i+1)th batch of samples by the at least one quantum processor. Determining the timing of the generation of the (i+1)th batch of samples generated by the at least one quantum processor may include determining the timing of the generation of the (i+1)th batch of samples generated by the at least one quantum processor based at least in part on a transmission of at least one signal that causes the generation of the ith batch of samples by the at least one quantum processor, and an amount of time required to generate the ith batch of samples by the at least one quantum processor. Determining the timing of the generation of the (i+1)th batch of samples generated by the at least one quantum processor may include determining a period of time proportional to a sum of a time required to read out values from the at least one quantum processor and a total time required to anneal for the number of samples requested. Causing the execution of at least one post-processing operation via at least one post-processing processor-based device on the ith batch of samples may include sending at least one signal that causes the post-processing of the ith batch of samples via at least one processor-based device.

The method of operation in a computational system that includes at least one processor-based controller communicatively coupled to at least one quantum processor which in operation generates batches of samples and operatively coupled to at least one post-processing processor-based device may further include, for a plurality of the iterations i from 2 to n−1, limiting a time for performing the at least one post-processing operations to be no greater than a time required to generate the (i+1)th batch of samples from the quantum processor.

The method of operation in a computational system that includes at least one processor-based controller communicatively coupled to at least one quantum processor which in operation generates batches of samples and operatively coupled to at least one post-processing processor-based device may further include: determining a time required to receive a batch of samples from the quantum processor; and determining a set of post-processing operations executable in the determined time.

Causing the execution of at least one post-processing operation via at least one processor-based device may include causing at least one of: a majority voting on chains of qubits post-processing operation, a local search to find a local minima post-processing operation, or a Markov Chain Monte Carlo simulation at a fixed temperature post-processing operation, via at least one digital processor. Causing the execution of at least one post-processing operation via at least one processor-based device may include causing the at least one post-processing operation via at least one of: a microprocessor, a digital signal processor (DSP), a graphical processing unit (GPU), or a field programmable gate array (FPGA). The at least one controller may include a server, communicatively coupled to the quantum processor.

The method of operation in a computational system that includes at least one processor-based controller communicatively coupled to at least one quantum processor which in operation generates batches of samples and operatively coupled to at least one post-processing processor-based device may further include sending a number of post-processed samples to a user via the server, wherein the causing the post-processing may be performed before the sending of the post-processed samples to the user.

The plurality of iterations may be performed for a respective one of each of a plurality of problems, and may further include, for each of the problems of the plurality of problems, determining a respective result based at least in part on at least some of the batches of samples generated during the respective iterations for the respective problem. The number n for a first one of the plurality of problems may be different than the number n for a second one of the plurality of problems. The at least one processor-based controller may include a server (e.g., server hardware), communicatively coupled to the quantum processor, and may further include sending a number of results to a user via the server.

A computational system may be summarized as including: at least one processor-based controller, at least one processor-based controller communicatively coupled to at least one quantum processor which in operation generates batches of samples, the at least one processor-based controller operatively coupled to at least one post-processing processor-based device, the processor-based controller which in use coordinates at least one post-processing operation performed via the at least one post-processing processor-based device on the generated batches of samples with generation of successive batches of samples via at least one quantum processor in a temporally overlapping manner.

The processor-based controller for a plurality of iterations i from 1 to a number n, where n is an integer greater than 2 may: determine a timing of a generation of an (i+1)th batch of samples generated by at least one quantum processor; and cause execution of the at least one post-processing operation via the at least one post-processing processor-based device on the ith batch of samples, where the at least one post-processing operation on an ith batch of samples may occur at least partially overlapping in time with a generation of an (i−1)th batch of samples for iterations between a first iteration and a last iteration, non-inclusive of the first iteration and the last iteration. The processor-based controller may cause the execution of the at least one post-processing operation timed such than the at least one post-processing operation on the ith batch of samples does not extend in time beyond the generation of the (i+1)th batch of samples for iterations between the first iteration and the last iteration, non-inclusive of the first iteration and the last iteration. The processor-based controller may determine that the (i+1)th batch of samples has been generated by the at least one quantum processor in order to determine the timing of the generation of the (i+1)th batch of samples generated by the at least one quantum processor. The processor-based controller may determine that the ith batch of samples has been generated by the at least one quantum processor in order to determine the timing of the generation of the (i+1)th batch of samples generated by the at least one quantum processor. The processor-based controller may further, for the plurality of iterations i from 1 to the number n, receive the ith batch of samples generated by at least one quantum processor, and determine the timing of the generation of the (i+1)th batch of samples generated by the at least one quantum processor based at least in part on receipt of the ith batch of samples. The processor-based controller may determine the timing of the generation of the (i+1)th batch of samples generated by the at least one quantum processor based at least in part on receipt of that the ith batch of samples by a component of the computational system that is different from the processor-based controller. The processor-based controller may determine the timing of the generation of the (i+1)th batch of samples generated by the at least one quantum processor based at least in part on a transmission of at least one signal that may cause the generation of the (i+1)th batch of samples by the at least one quantum processor. The processor-based controller may determine the timing of the generation of the (i+1)th batch of samples generated by the at least one quantum processor based at least in part on a transmission of at least one signal that causes the generation of the ith batch of samples by the at least one quantum processor, and an amount of time required to generate the ith batch of samples by the at least one quantum processor. The processor-based controller may send at least one signal that causes the post-processing of the ith batch of samples via at least one processor-based device in order to cause the execution of the at least one post-processing operation via at least one post-processing processor-based device on the ith batch of samples. The processor-based controller may determine a period of time proportional to a sum of a time required to read out values from the at least one quantum processor and a total time required to anneal for the number of samples requested in order to determine the timing of the generation of the (i+1)th batch of samples generated by the at least one quantum processor. The processor-based controller may further, for the plurality of iterations i from 2 to n−1, limit a time for performance of the at least one post-processing operations to be no greater than a time required to receive the batch of samples from the quantum processor. The processor-based controller may further: determine a time required to receive a batch of samples from the quantum processor; and determine a set of post-processing operations executable in the determined time. The processor-based controller may cause execution of the at least one post-processing operation via at least one of: a microprocessor, a digital signal processor (DSP), a graphical processing unit (GPU), or a field programmable gate array (FPGA). The at least one controller may include a server, communicatively coupled to the quantum processor, and may further send a number of post-processed samples to a user, wherein causing the post-processing may be performed before the post-processed samples are sent to the user. The plurality of iterations may be performed for a respective one of each of a plurality of problems, and at least one processor-based controller may further, for each of the problems of the plurality of problems, determine a respective result based at least in part on at least some of the batches of samples generated during the respective iterations for the respective problem. The number n for a first one of the plurality of problems may be different than the number n for a second one of the plurality of problems. The at least one processor-based controller may include a server, communicatively coupled to the quantum processor, and the processor-based controller may further send a number of results to a user via the server.

A method of operation in a computational system may be summarized as including: for each of a number of problems, performing a pre-processing assessment and/or evaluation of the problem by a processor-based device; selecting, by the processor-based device, at least one heuristic optimizer from a plurality of the heuristic optimizers based at least in part on the pre-processing assessment and/or the evaluation of the problem; and causing the problem to be optimized via the at least one selected heuristic optimizer.

The method may further include: receiving the problem; determining a format of the problem; and determining whether the determined format of the problem is a supported format.

The method of operation in a computational system may further include: rejecting the problem if the determined format of the problem is not supported; and providing a notification of the rejection of the problem.

The method of operation in a computational system may further include: in response to the format of the problem being supported, generating a plurality of representations of problem; for each of the representations of the problem, extracting a number of features from the problem; assessing and/or evaluating each of a plurality of solvers based at least in part on the extracted features; selecting one or more solvers based on the assessment and/or the evaluation by the processor-based device; and causing the selected one or more solvers to operate on the problem.

Selecting one or more solvers based on the assessment and/or the evaluation by the processor-based device may include autonomously selecting one or more solvers by the system hardware based on the assessment and/or the evaluation by the processor-based device, without human interaction. Assessing and/or evaluating each of a plurality of solvers based at least in part on the extracted features may include predicting how successful each of the solvers of the plurality of solvers would be in returning an optimal solution for the problem using the extracted features. Causing the selected one or more solvers to operate on the problem may include sending the problem to the selected solvers. At least two solvers may be selected, the two solvers different from one another, and may further include: comparing the results from each of the selected at least two solvers; and determining a best solution based at least in part on the comparison.

The method of operation in a computational system may further include returning the determined best solution to user via a network interface.

The method of operation in a computational system may further include: for each of the selected solvers, splitting the problem into a number of portions; distributing the portions to respective ones of a plurality of computational resources; and generating a final result for respective solver for the respective problem based on the results from the portions.

Generating a final result for respective solver for the respective problem based on the results from the portions may include: gathering the results of each portion of the respective problem; and combining the gathered results of each portion of the respective problem to generate the final result for respective solver for the respective problem.

Distributing the portions to respective ones of a plurality of computational resources may include distributing the portions to respective ones of a plurality of computational resources based on a type of processing required by the respective portion of the problem. At least two solvers may be selected, the two solvers different from one another, and may further include: comparing the final result for respective solver for the respective problem for each of the selected at least two solvers; and determining a best solution based at least in part on the comparison.

The method of operation in a computational system may further include returning the determined best solution to user via a network interface.

Selecting at least one heuristic optimizer from a plurality of the heuristic optimizers may include autonomously selecting at least one heuristic optimizer from a plurality of the heuristic optimizers by the system hardware based at least in part on the assessment and/or the evaluation of the problem, without human interaction. Autonomously selecting one heuristic optimizer from a plurality of the heuristic optimizers may include autonomously selecting at least two heuristic optimizers, different from one another, based at least in part on the assessment and/or the evaluation of the problem without reference to any user input other than the respective problem and problem type.

The method of operation in a computational system may further include causing a performing of at least one post-processing operation via at least one post-processing processor-based device on a number of samples resulting from the heuristic optimization performed on the problem.

Causing a performing of at least one post-processing operation may include causing the performing of the at least one post-processing operation via at least one non-quantum processor-based device. Causing a performing of at least one post-processing operation via at least one non-quantum processor-based device may include causing the at least one post-processing operation via at least one of a microprocessor, a digital signal processor (DSP), a graphical processing unit (GPU), or a field programmable gate array (FPGA), and may further include receiving samples generated via the heuristic optimization executed by the at least one of the microprocessor, the DSP, the GPU, or FPGA. The computational system may include at least one of a microprocessor, a digital signal processor (DSP), a graphical processing unit (GPU), or a field programmable gate array (FPGA), and causing a performing of at least one post-processing operation via at least one processor-based device may include causing the at least one post-processing operation via at least one of the microprocessor, the DSP, the GPU, or the FPGA. Causing a performing of at least one post-processing operation via at least one processor-based device may include causing at least one of: a majority voting on chains of qubits post-processing operation, a local search to find a local optima post-processing operation, or a Markov Chain Monte Carlo simulation at a fixed temperature post-processing operation, via at least one digital processor. The computational system may include the at least one processor that executes the heuristic optimizer, and may further include performing the heuristic optimization on the respective problem by the at least one processor. The computational system may include the at least one processor that executes the heuristic optimizer in the form of at least one non-quantum processor selected from at least one of a microprocessor, a digital signal processor (DSP), a graphical processing unit (GPU), or a field programmable gate array (FPGA), and may further include performing the heuristic optimization on the respective problem by the at least one non-quantum processor. The computational system may include the at least one processor that executes the heuristic optimizer in the form of at least one quantum processor, and may further include performing the heuristic optimization on the respective problem by the at least one quantum processor. A computational system may be summarized as including: for each of a number of problems, performing a pre-processing assessment and/or the evaluation of the problem by a processor-based device; selecting, by the processor-based device, at least one heuristic optimizer from a plurality of the heuristic optimizers based at least in part on the pre-processing assessment and/or the evaluation of the problem; and causing the problem to be optimized via the at least one selected heuristic optimizer.

The processor-based device may further: receive the problem; determine a format of the problem; and determine whether the determined format of the problem is a supported format. The processor-based device may further: reject the problem if the determined format of the problem is not supported; and provide a notification via a network of the rejection of the problem. The processor-based device may further: in response to the format of the problem being supported, generate a plurality of representations of problem; for each of the representations of the problem, extract a number of features from the problem; assess and/or evaluate each of a plurality of solvers based at least in part on the extracted features; autonomously select one or more solvers, by the system hardware, based on the assessment and/or the evaluation by the processor-based device; and cause the selected one or more solvers to operate on the problem. The processor-based device may autonomously select the one or more solvers based on the assessment and/or the evaluation by the processor-based device, without human interaction. The processor-based device may predict how successful each of the solvers of the plurality of solvers would be in returning an optimal solution for the problem using the extracted features in order to assess and/or evaluates each of a plurality of solvers based at least in part on the extracted features, autonomously, without human interaction. The processor-based device may send the problem to the selected solvers in order to cause the selected one or more solvers to operate on the problem. At least two solvers may be selected, the two solvers different from one another, and the processor-based device may further: compare the results from each of the selected at least two solvers; and determine a best solution based at least in part on the comparison. The processor-based device may further return the determined best solution to user via a network interface. The processor-based device may further: for each of the selected solvers, split the problem into a number of portions; distribute the portions to respective ones of a plurality of computational resources; and generate a final result for respective solver for the respective problem based on the results from the portions, which can be performed, autonomously, without human interaction. To generate a final result for respective solver for the respective problem based on the results from the portions the processor-based device may: gathers the results of each portion of the respective problem; and combine the gathered results of each portion of the respective problem to generate the final result for respective solver for the respective problem. The processor-based device may distribute the portions to respective ones of a plurality of computational resources based on a type of processing required by the respective portion of the problem. At least two solvers may be selected, the two solvers different from one another, and the processor based device may further: compare the final result for each respective solver for the respective problem for each of the selected at least two solvers; and determine a best solution based at least in part on the comparison. The processor-based device may further return the determined best solution to user via a network interface. The processor-based device may autonomously select the at least one heuristic optimizer from a plurality of the heuristic optimizers based at least in part on the assessment and/or the evaluation of the problem, without human interaction. The processor-based device may autonomously select at least two heuristic optimizers, different from one another, based at least in part on the assessment and/or the evaluation of the problem without reference to any user input other than the respective problem and problem type. The processor-based device may further perform at least one post-processing operation via at least one post-processing processor-based device on a number of samples resulting from the heuristic optimization performed on the problem. The processor-based device may cause the performing of the at least one post-processing operation via at least one non-quantum processor-based device. The processor-based device may cause the at least one post-processing operation via at least one of a microprocessor, a digital signal processor (DSP), a graphical processing unit (GPU), or a field programmable gate array (FPGA), and may further receive samples generated via the heuristic optimization executed by the at least one of the microprocessor, the DSP, the GPU, or FPGA. The computational system may include at least one of a microprocessor, a digital signal processor (DSP), a graphical processing unit (GPU), or a field programmable gate array (FPGA), and may cause the at least one of the microprocessor, the DSP, the GPU, or the FPGA to perform the at least one post-processing operation. The at least one processor-based device may cause performing of at least one of: a majority voting on chains of qubits post-processing operation, a local search to find a local optima post-processing operation, or a Markov Chain Monte Carlo simulation at a fixed temperature post-processing operation via at least one digital processor. The computational system may include the at least one processor that executes the heuristic optimizer. The computational system may include the at least one processor that executes the heuristic optimizer in the form of at least one non-quantum processor selected from at least one of a microprocessor, a digital signal processor (DSP), a graphical processing unit (GPU), or a field programmable gate array (FPGA), and may further include performing the heuristic optimization on the respective problem by the at least one non-quantum processor. The computational system may include the at least one processor that executes the heuristic optimizer in the form of at least one quantum processor.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

Figure 11:
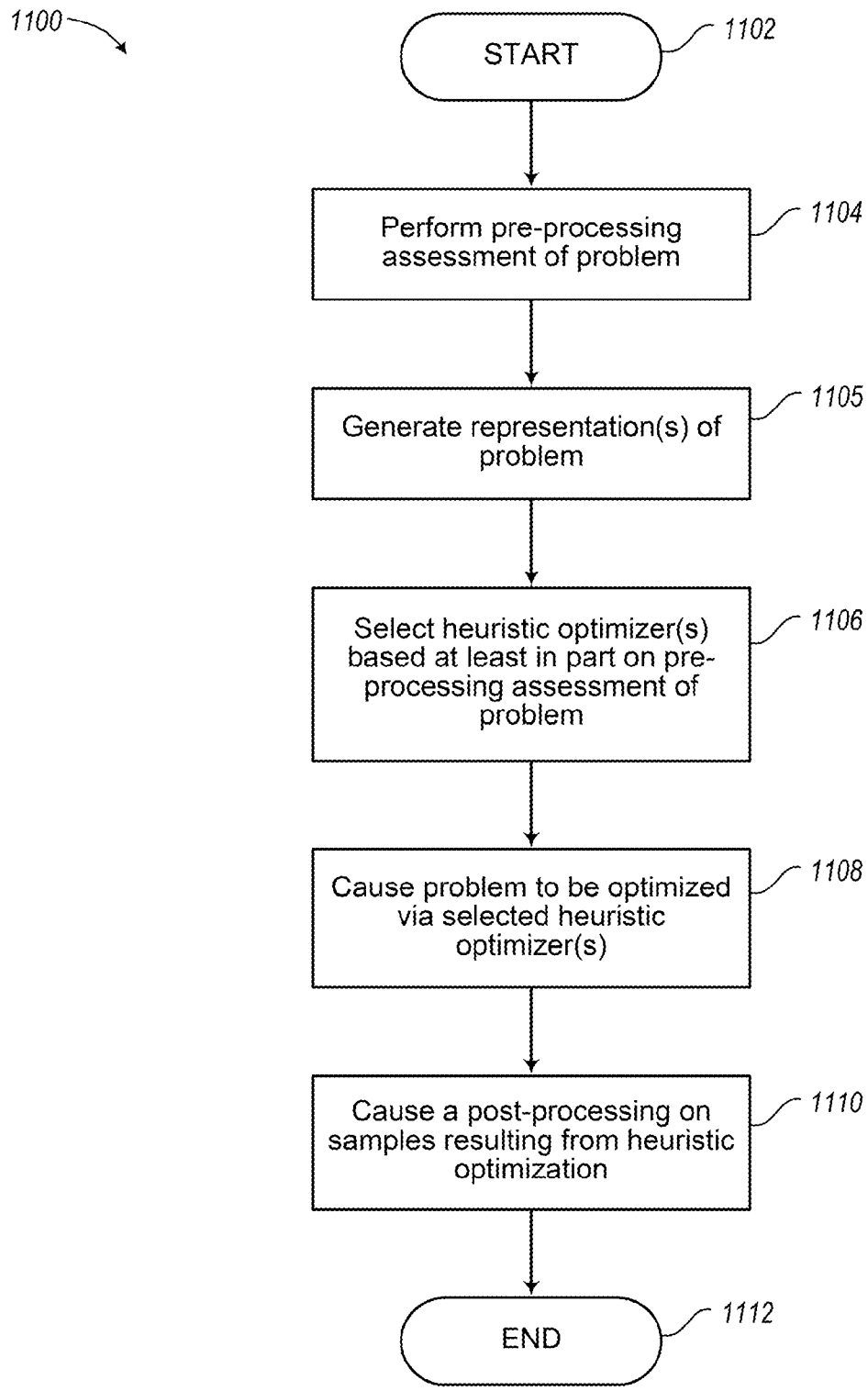

FIG. 11 is a flow diagram showing a high-level method of operation in a computational system which includes pre-processing, processing and post-processing a problem, including assessing or evaluating and selecting one or more heuristic solvers for a problem based on characteristics or features of the problem to be solved, in accordance with the presently described systems, devices, articles and methods.

Figure 12:
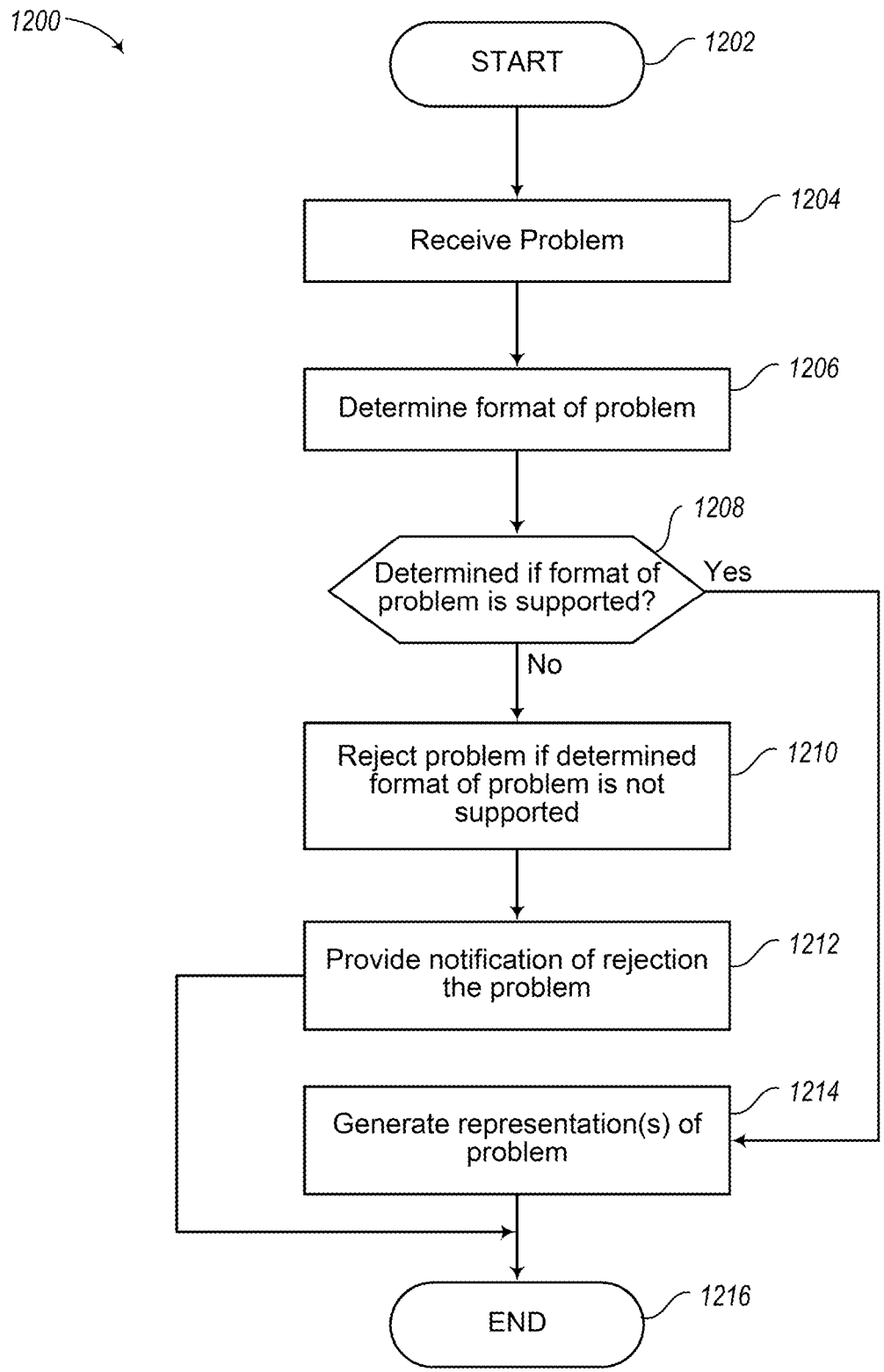

FIG. 12 is a flow diagram showing a high-level method of operation in a computational system which includes checking whether a format of a problem is supported by the computational system, and rejecting the problem if not supported or generation representations of the problem if supported, in accordance with the presently described systems, devices, articles and methods, and which may be performed as part of the method of FIG. 11.

Figure 13:
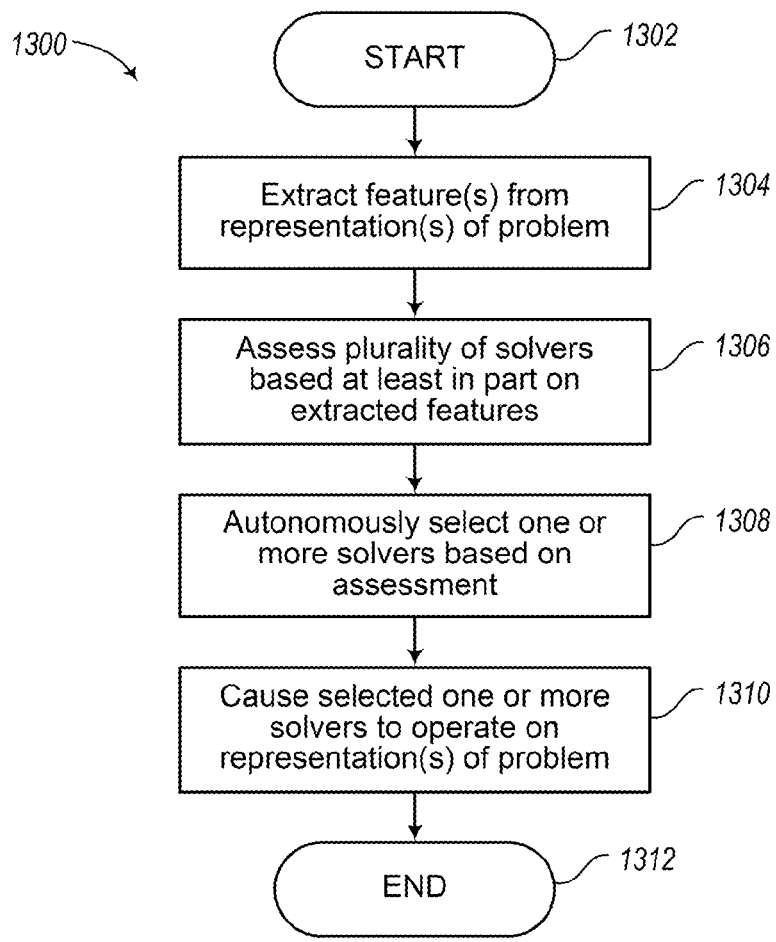

FIG. 13 is a flow diagram showing a low-level method of operation in a computational system which includes extracting features, assessing or evaluating solvers, and selecting solvers based on the assessment or evaluation, in accordance with the presently described systems, devices, articles and methods, and which may be performed as part of the method of FIG. 11.

Figure 14:
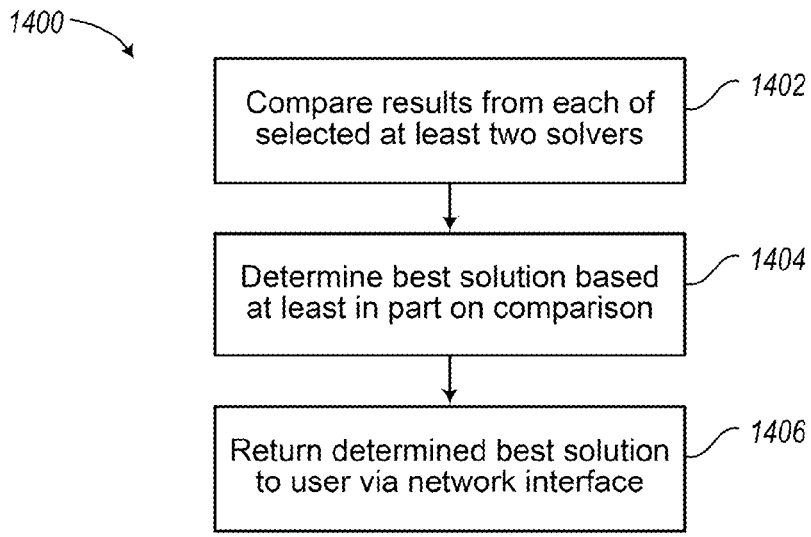

FIG. 14 is a flow diagram showing a low-level method of operation in a computational system which includes comparing results of two or more solvers, determining and returning a best solution, in accordance with the presently described systems, devices, articles and methods, and which may be performed as part of the method of FIG. 11.

Figure 15:
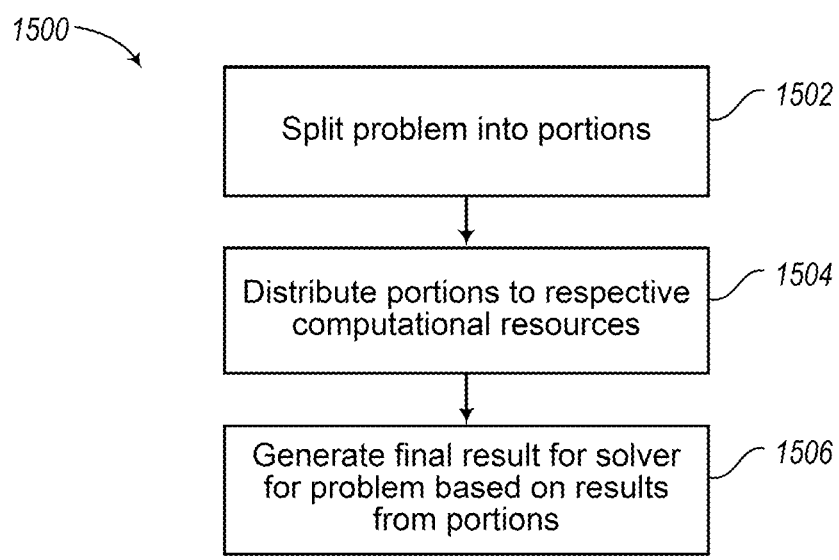

FIG. 15 is a flow diagram showing a low-level method of operation in a computational system which includes splitting a problem into portions, distributing the portions to respective hardware resources, and generating a final result, in accordance with the presently described systems, devices, articles and methods, and which may be performed as part of the method of FIG. 11.

Figure 16:
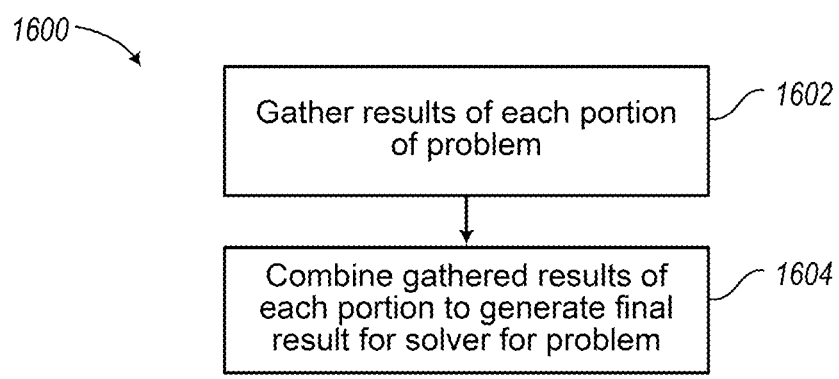

FIG. 16 is a flow diagram showing a low-level method of operation in a computational system which includes gathering results from solving each portion of the split problem, and combining the gathered results, in accordance with the presently described systems, devices, articles and methods, and which may be performed as part of the method of FIG. 15.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with digital processors, such as digital microprocessors, digital signal processors (DSPs), digital graphical processing units (GPUs), field programmable gate arrays (FPGAs); analog or quantum processors, such as quantum devices, coupling devices, and associated control systems including microprocessors, processor-readable nontransitory storage media, and drive circuitry have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

Figure 1A:
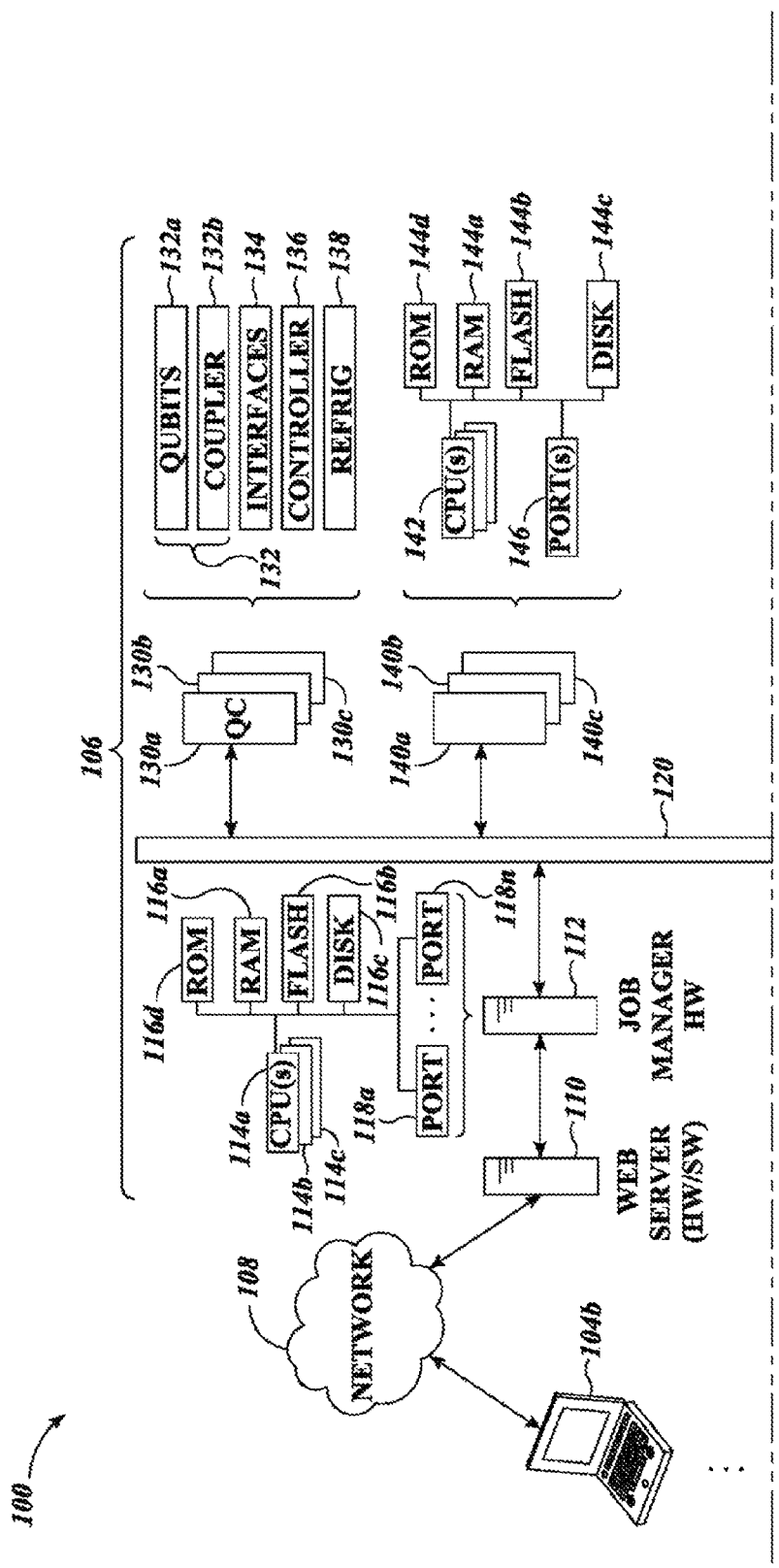
FIGS. 1A and 1B are schematic diagrams of an environment in which users may access a system via one or more networks, in accordance with the presently described systems, devices, articles and methods, illustrating various hardware structures and interconnections therebetween.
Figure 1B:
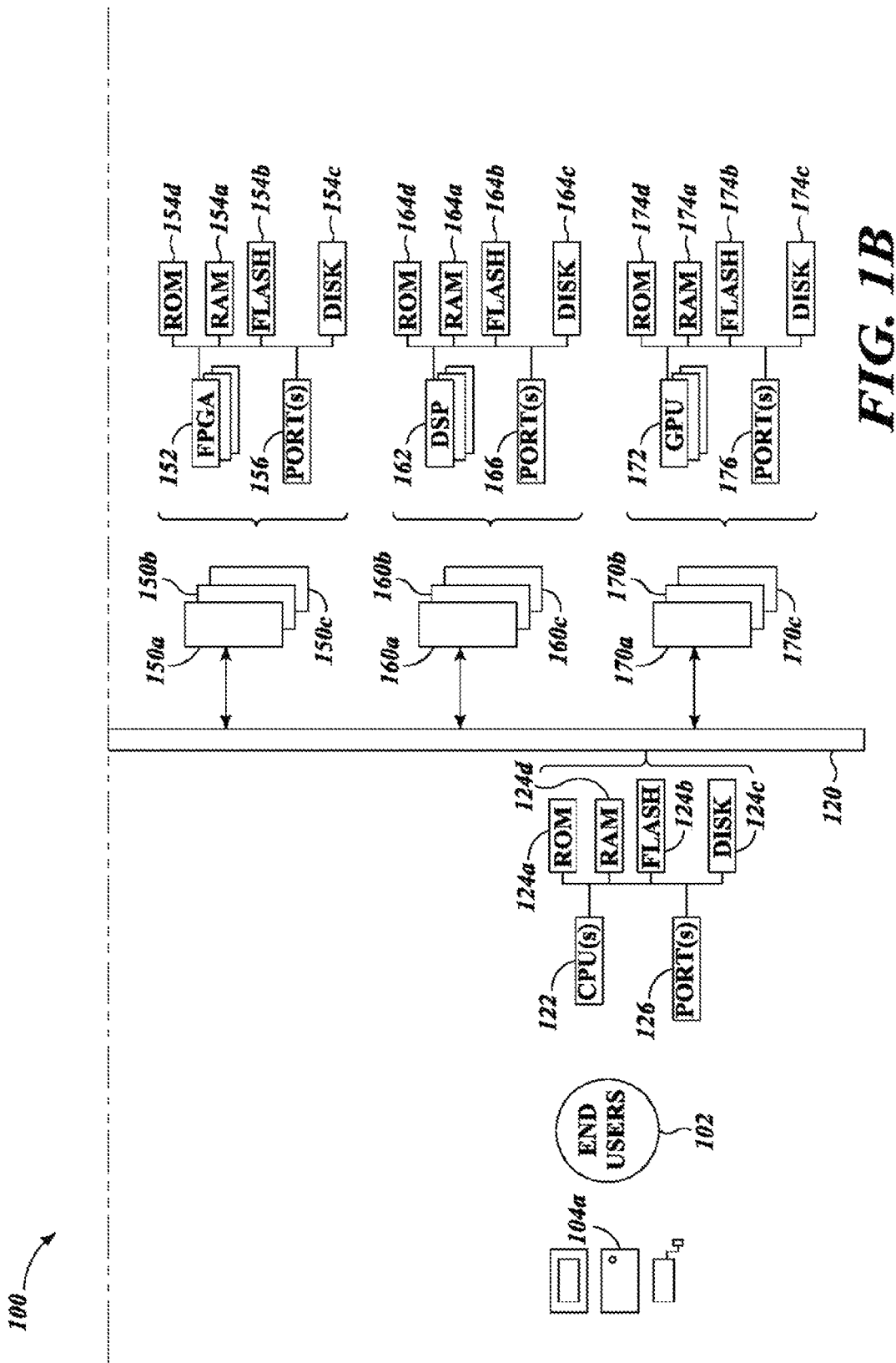

FIGS. 1A and 1B show an exemplary networked environment 100 in which a plurality of end users 102 (only one shown) operate end user processor-based devices 104a-104n (collectively 104) to access a computational system 106 via one or more communications channels such as networks 108, according to the presently described systems, devices, articles and methods.

The end user processor-based devices 104 may take any of a variety of forms, for example including desktop computers or workstations 104a, laptop computers 104b, tablet computers (not shown), netbook computers (not shown), and/or smartphones (not shown).

The computational system 106 may include a front-end processor-based device, for example a server computer system such as a Web server computer system 110 which includes one or more processors (not shown), nontransitory processor-readable media (not shown) and which executes processor-executable server instructions or software. The front-end server or Web server computer system 110 handles communication with the outside world. For example, the Web server computer system 110 provides an interface (server application programming interface or SAPI) for the submission by the end user processor-based devices 104 of problems to be solved. Also for example, the Web server computer system 110 provides results of problem solving to the end user processor-based devices 104. The Web server computer system 110 may provide a user friendly user interface, for example a Web-based user interface, Web portal or Web services interface. The Web server computer system 110 may, for example, handle users' accounts, including authentication and/or authorization to access various resources. The Web server computer system 110 may also implement a firewall between the remainder of the computational system 106 and the outside world (e.g., end user processor-based devices 104).

The SAPI accepts a broader range of problems including pseudo-Boolean optimization problems, constraint satisfaction problems, sampling problems, and the like. End users may, for example, indicate whether the solving should identify minima or should sample with Boltzmann probability. The SAPI also supports unconstrained QUBOs of arbitrary connectivity. That is accepts a logical graph with different connectivities than a working graph. The SAPI also accepts graphical models, for instance factor-graph description of undirected graphical models defined over binary-valued variables. The SAPI may allow for a description of factors specified with the scope of the factor and an extensional list of factor values. Support is preferably provided for factors mapping inputs to floating point values and to Boolean values for constraint satisfaction problems (CSP). The SAPI also accepts quadratic assignment problems (QAPs) since many practical problems involve assignment constraints. The SAPI may accept satisfiability problems (SAT), for instance: k-SAT, CSP; or max (weighted) SAT, a related optimization problem. Standard DIMACS formats exist for these types of problems.

Figure 3A:
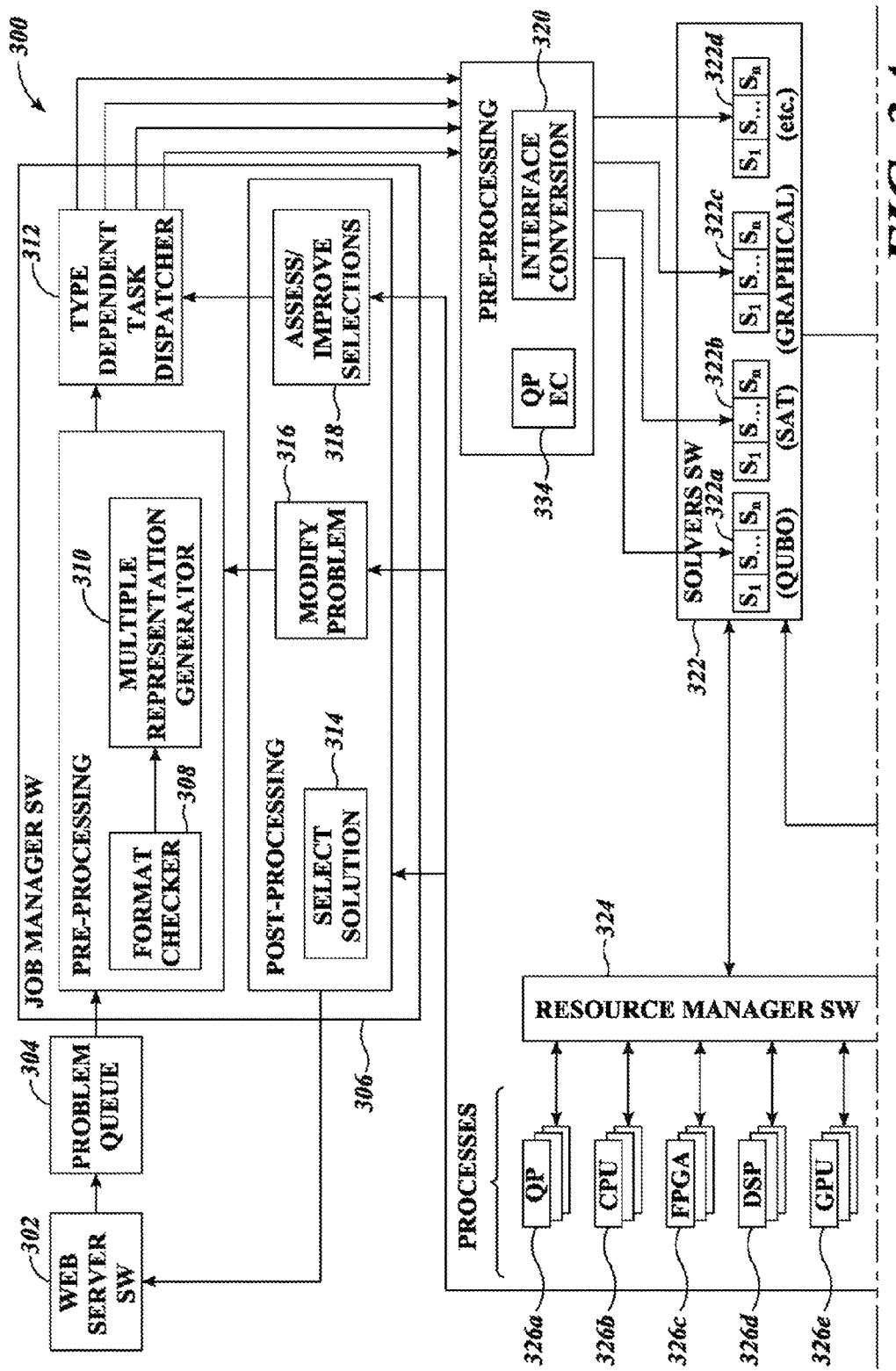
FIGS. 3A and 3B are schematic diagrams showing various sets of processor readable instructions, processes and abstraction layers implemented by the system of FIGS. 1A and 1B, such as a job manager instructions, resource manager instructions, solver instructions, pre-processing and post-processing instructions, in accordance with the presently described systems, devices, articles, and methods.
Figure 3B:
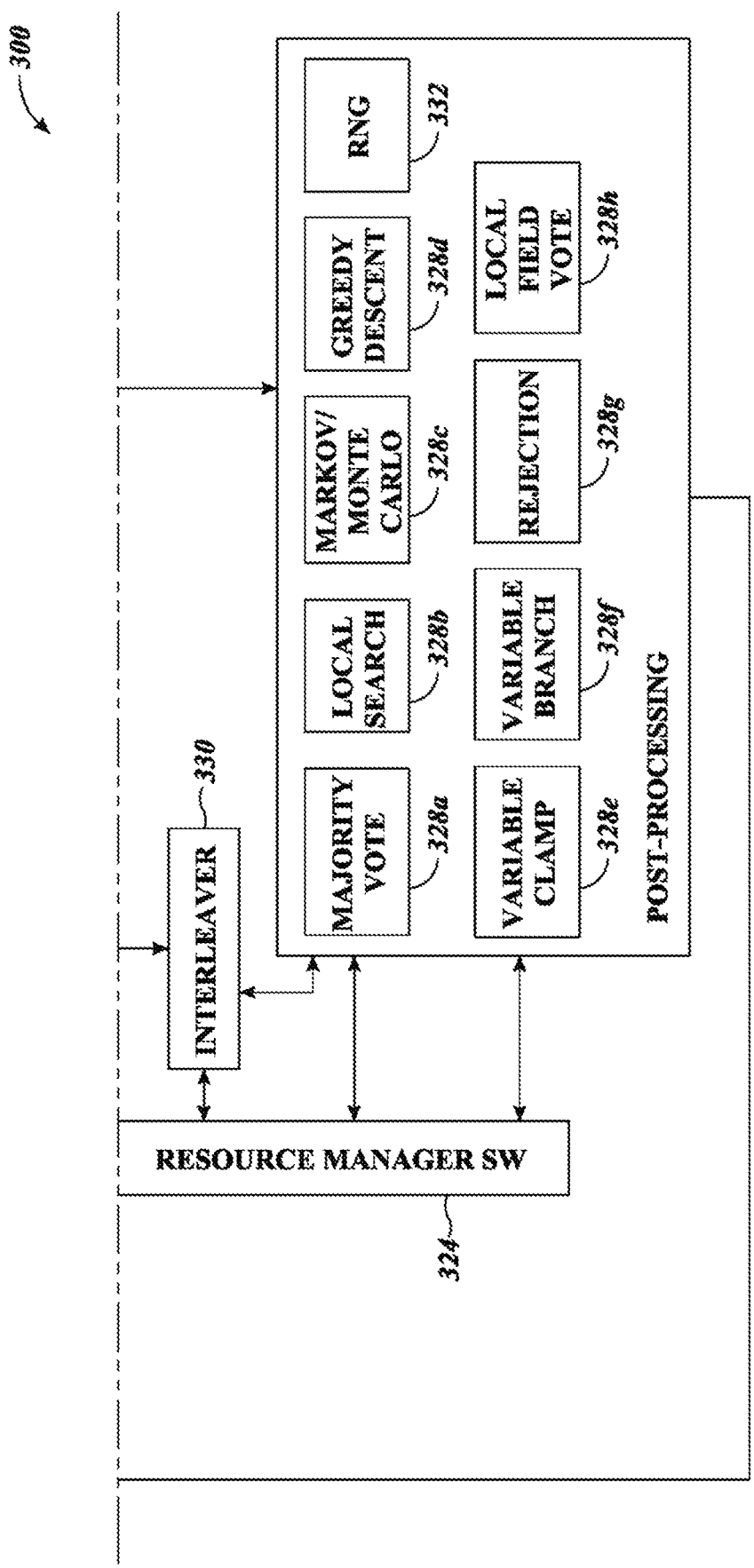

The computational system 106 may include job manager hardware 112 which manages jobs (i.e., submitted problems and results of problem solving). The job manager hardware 112 may be implemented as a standalone computing system, which may include one or more processors 114, processor-readable nontransitory storage media 116a-116d (four shown, collectively 116) and communications ports 118a, 118n (two shown, collectively 118). The processor(s) 114 may take a variety of forms, for example one or more microprocessors, each having one or more cores or CPUs, registers, etc. The job manager hardware 112 may include volatile media or memory, for example static random access memory (SRAM) or dynamic random access memory (DRAM) 116a. The job manager hardware 112 may include non-volatile media or memory, for example read only memory (ROM) 116d, flash memory 116b, or disk based memory such as magnetic hard disks, optical disks 116c, magnetic cassettes, etc. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In-line Memory Modules. The processor-readable nontransitory storage media 116 store(s) at least one set of processor-executable instructions and/or data (e.g., job manager instructions 306, FIGS. 3A and 3B) to manage problem solving jobs, which when executed by the job manager hardware 112 implements a job manager (FIGS. 3A and 3B).

The computational system 106 may include resource manager hardware 120 which manages hardware resources (e.g., processors) for use in solving problems via a plurality of solvers. The resource manager hardware 120 may be implemented as a standalone computing system, which may include one or more processors 122, each having one or more cores, processor-readable nontransitory storage media 124a-124d (four shown, collectively 124) and one or more communications ports 126. The processor(s) 122 may take a variety of forms, for example one or more microprocessors, each having one or more cores or CPUs, registers, etc. The resource manager hardware 120 may include non-volatile media or memory, for example read only memory (ROM) 124a, flash memory 124b, or disk based memory such as magnetic hard disks 124c, optical disks, etc. The resource manager hardware 120 may include volatile media or memory, for example static random access memory (SRAM) or dynamic random access memory (DRAM) 124d. The processor-readable nontransitory storage media 124 store(s) at least one of set pf processor-executable instructions and/or data (e.g., resource manager instructions 324, FIGS. 3A and 3B) which when executed by the resource manager hardware 120 implements a resource manager to manage hardware resources, for example the various non-quantum processor systems and/or quantum processor systems and/or digital computer systems and/or analog computer systems set out immediately below. The resource manager may, for instance, manage an allocation of processor resources (e.g., quantum processor(s)) to solve a submitted problem via one or more solvers.

As noted above, the computational system 106 may further include a plurality of solver processor systems which execute solver instructions or software to implement a plurality of solvers to solve appropriate types of problems (e.g., QUBO matrix, satisfiability (SAT) problem, a graphical model (GM) or a quadratic assignment problem (QAP)).

The solver processor systems may, for example, include one or more analog computers 130a-130c (three illustrated, collectively 130, only one shown in detail) including one or more quantum processors. Quantum processor systems 130 may take a variety of forms. Typically, quantum processors systems 130 will include one or more quantum processors 132 comprised of a plurality of qubits 132a and couplers 132b (e.g., tunable ZZ-couplers) which are controllable to set a coupling strength between respective pairs of qubits 132a to provide pair-wise coupling between qubits. The quantum processor systems 10 may be implemented to physically realize quantum annealing (QA) and/or adiabatic quantum computing (AQC) by initializing the system in an initial state preferred by an initial Hamiltonian and evolving the system to a final state preferred by a problem Hamiltonian.

The quantum processors systems 130 typically include a plurality of interfaces 134 operable to set or establish conditions or parameters of the qubits 132a and couplers 132b, and to read out the states of the qubits 132a, from time-to-time. The interfaces 134 may include a local bias interface to provide controllable local biases to the qubits 132a (e.g., tunable local diagonal bias). The interfaces 134 may each be realized by a respective inductive coupling structure, as part of a programming subsystem and/or an evolution subsystem. Interfaces for reading out states may, for instance take the form of DC-SQUID magnetometers. Such a programming subsystem and/or evolution subsystem may be separate from quantum processor 130, or it may be included locally (i.e., on-chip with quantum processor 130) as described in, for example, U.S. Pat. Nos. 7,876,248; and 8,035,540.

The quantum processors systems 130 typically each include a controller 136, for instance a digital computer system, which is operated to configure the quantum processor 132. The quantum processors systems 130 typically each include a refrigeration system 138, operable to reduce a temperature of the quantum processor 132 to a point at or below which various elements of the quantum processor 132 (e.g., qubits 132a, couplers 132b) superconduct. Superconducting quantum computers normally are operated at milliKelvin temperatures and often are operated in a dilution refrigerator. Examples of dilution refrigerators include the Oxford Instruments Triton 400 (Oxford Instruments plc, Tubney Woods, Abingdon, Oxfordshire, UK) and BlueFors LD 400 (BlueFors Cryogenics Oy Ltd, Arinatie 10, Helsinki, Finland). All or part of the components of quantum processor may be housed in a dilution refrigerator.

In the operation of a quantum processor system 130, interfaces 134 may each be used to couple a flux signal into a respective compound Josephson junction of qubits 132a, thereby realizing the tunneling terms (also called $\Delta_i$ terms) in the system Hamiltonian. This coupling provides the off-diagonal terms ($\sigma^x$ terms) of the Hamiltonian and these flux signals are examples of "dislocation signals." Other ones of the interfaces 134 may each be used to couple a flux signal into a respective qubit loop of qubits 132a, thereby realizing the local bias terms (also called $h_i$ terms) in the system Hamiltonian. This coupling provides the diagonal terms ($\sigma^z$ terms). Furthermore, one or more interfaces 134 may be used to couple a flux signal into couplers 132b, thereby realizing the $J_{ij}$ term(s) in the system Hamiltonian. This coupling provides the diagonal terms ($\sigma^z_i \sigma^z_j$ terms). Thus, throughout this specification and the appended claims, the terms "problem formulation" and "configuration of a number of programmable parameters" are used to refer to, for example, a specific assignment of $h_i$ and $J_{ij}$ terms in the system Hamiltonian of a superconducting quantum processor via, for example, interfaces 134.

The solver processor systems may, for example, include one or more non-quantum processor systems. Non-quantum processor systems may take a variety of forms, at least some of which are discussed immediately below.

For example, the non-quantum processor systems may include one or more microprocessor based systems 140a-140c (three illustrated, collectively 140, only one shown in detail). Typically, microprocessor based systems 140 will each include one or more microprocessors 142 (three shown, only one called out in FIGS. 3A and 3B), processor-readable nontransitory storage media 144a-144d (four shown, collectively 144) and one or more communications ports 146. The processor(s) 142 may take a variety of forms, for example one or more microprocessors, each having one or more cores or CPUs with associated registers, arithmetic logic units, etc. The microprocessor based systems 140 may include non-volatile media or memory, for example read only memory (ROM) 144d, flash memory 144b, or disk based memory such as magnetic hard disks 144c, optical disks, etc. The microprocessor based systems 140 may include volatile media or memory, for example static random access memory (SRAM) or dynamic random access memory (DRAM) 144a. The processor-readable nontransitory storage media 144 store(s) at least one of a set of processor-executable instructions and/or data which when executed by the microprocessor based systems 142 implements a microprocessor based solver to solve a submitted problem.

Also for example, the non-quantum processor systems may include one or more field programmable arrays (FPGA) based systems 150a-150c (three illustrated, collectively 150, only one shown in detail). Typically, FPGA based systems 150 will each include one or more FPGAs 152, processor-readable nontransitory storage media 154a-154d (four shown, collectively 154) and one or more communications ports 156. The FPGAs 152 may take a variety of forms, for example one or more FPGAs 152. The FPGA based systems 150 may include non-volatile media or memory, for example, read only memory (ROM) 154d, flash memory 154b, or disk based memory such as magnetic hard disks 154c, optical disks, etc. The FPGA based systems 150 may include volatile media or memory, for example static random access memory (SRAM) or dynamic random access memory (DRAM) 154d. The processor-readable nontransitory storage media 154 store(s) at least one of a set of processor-executable instructions and/or data which when executed by the FPGA based systems 150 implements a FPGA based solver to solve a submitted problem.

Also for example, the non-quantum processor systems may include one or more digital signal processor based systems 160a-160c (three illustrated, collectively 160, only one shown in detail). Typically, DSP based systems 160 will include one or more DSPs 162, processor-readable nontransitory storage media 164a-164d (four shown, collectively 160) and one or more communications ports 166. The DSPs 162 may take a variety of forms, for example one or more DSPs, each having one or more cores or CPUs, registers, etc. The DSP based systems 160 may include non-volatile media or memory, for example read only memory (ROM) 164d, flash memory 164b, or disk based memory such as magnetic hard disks 164c, optical disks, etc. The DSP based systems 160 may include volatile media or memory, for example static random access memory (SRAM) or dynamic random access memory (DRAM) 164a. The processor-readable nontransitory storage media 164 store(s) at least one of a set of processor-executable instructions and/or data which when executed by the DSP based systems 160 implements a DSP based solver to solve a submitted problem.

For example, the non-quantum processor systems may include one or more graphical processing unit (GPU) based systems 170a-170c (three illustrated, collectively 170, only one shown in detail). Typically, GPU based systems 170 will include one or more GPUs 172, processor-readable nontransitory storage media 174a-174d (four shown, collectively 174) and communications ports 176. The GPUs 172 may take a variety of forms, for example one or more GPUs, each having one or more cores or CPUs, registers, etc. The GPU based systems 170 may include non-volatile media or memory, for example, read only memory (ROM) 174d, flash memory 174b, or disk based memory such as magnetic hard disks 174c, optical disks, etc. The GPU based systems 170 may include volatile media or memory, for example static random access memory (SRAM) or dynamic random access memory (DRAM) 174a. The processor-readable nontransitory storage media 174 store(s) at least one of a set of processor-executable instructions and/or data which when executed by the GPU based systems 170 implements a GPU based solver to solve a submitted problem.

Microprocessors offer relatively few cores with large amount of fast memory per core. Microprocessors are the most flexible platform in terms of development among the four non-quantum technologies discussed herein. Microprocessors also have the fastest clock speed and the most extensive instruction sets of the four non-quantum technologies discussed herein, which includes vector operations. An example of a currently available high performance microprocessor running 8 cores with a clock speed of 3.1 GHz is the Xeon Processor E5-2687 W offered by Intel Corporation.

DSPs are the closest to microprocessors in characteristics and abilities of the four non-quantum technologies discussed herein. The main advantage of DSPs are their advanced ALU units optimized for special numerical operations like Multiply-Accumulate (MAC) as compared to microprocessors. An example of a high performance DSP running 8 cores with a clock speed of 1.4 GHz is the TMS320C6678 Multicore Fixed and Floating Point DSP Processor offered by Texas Instruments. Creating a custom board with a plurality of DSPs is typically simpler than creating a customer board using microprocessors. Most advanced DSPs offer built-in functionalities that simplify task management and interfacing with other devices.

GPUs offer the largest number of inexpensive cores in a single unit (e.g., up to more than 5000 cores in the commercially available GeForce Titan Z offered by NVIDIA Corporation). GPU clock speeds are comparable to DSP processors (e.g., in 1 GHz range), but suffer from the limited amount of shared memory per core. GPUs implement single instruction, multiple data (SIMD) architectures, which cause all cores to run the same instruction in each cycle. Therefore, methods that require some serial work after a short amount of parallel work achieve significantly lower performance compared to completely parallel approaches, for the same amount of total work. An example of a commercially available GPU running 1536 cores at a clock speed of 1 GHz is the GeForce GTX 770 offered by NVIDIA. However, NVIDIA strongly recommends the use of Tesla GPUs for high performance computation.

FPGAs comprise of a pool of logic gates, memory blocks and simple DSP units that can be "wired up" programmatically. FGPAs offer a large amount of fast distributed memory and DSP units. The clock speed of an FGPA depends on the implemented circuit, but is typically lower than the other three non-quantum technologies discussed herein. For example, a clock speed of about 200 MHz is a reasonable clock speed in many cases. There is a relatively small limit on the number of times an FPGA can be programmed (roughly 100,000 times), so applications that require switching between multiple designs on-demand should utilize multiple FPGAs. An example of a currently available high performance FPGA is Xilinx's XC7VX485T, which has approximately half a million logic cells and flip-flops, more than one thousand 36 Kb memory blocks and 2800 DSP units.

Figure 2:
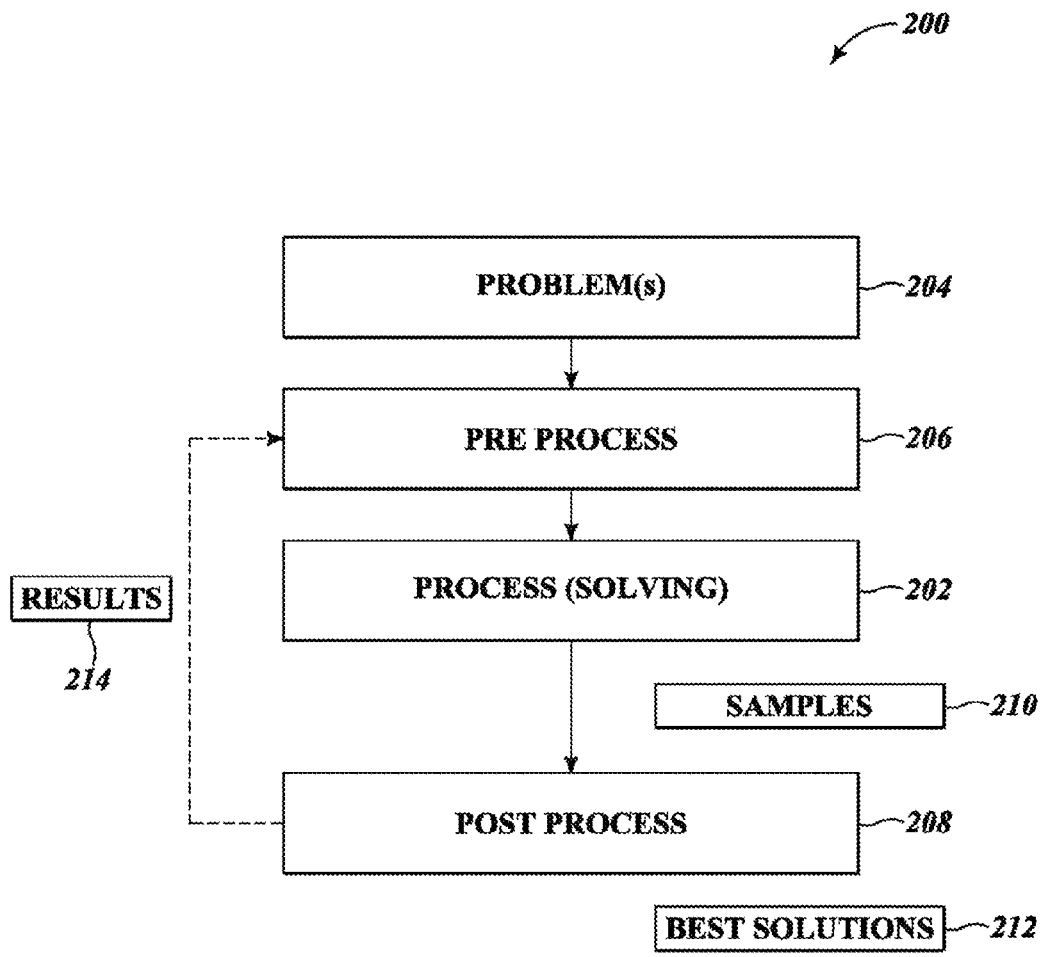
FIG. 2 is a high level schematic diagram of a relationship between pre-processing, processing, post-processing and optionally auxiliary processing implemented in the system of FIGS. 1A and 1B, in accordance with the presently described systems, devices, articles and methods.

FIG. 2 shows a high level relationship 200 between various aspects of the operation of the computational system of FIGS. 1A and 1B.

In particular, the computational system performs processing 202 in the form of solving submitted problems 204, typically via one or more of solvers, for instance one or more of a plurality of heuristic optimizers executed via hardware resources.

In preparation to performing the processing 202 on each problem 204, the computational system may perform pre-processing 206. As discussed in detail in reference to other Figures (e.g., FIGS. 3A and 3B), the pre-processing 206 may, for example, include one or more of format checking, problem representation generation, solver selection, and/or interface conversion. As discussed in detail in reference to other Figures (e.g., FIGS. 3A and 3B), the pre-processing 206 may, for example, be performed by various processors or systems, and/or may be performed by various logical abstractions in the instructions sets. For instance, some pre-processing 206 may be performed by the job manager hardware, executing job manager software, while other pre-processing may be executed by solver hardware executing solver specific pre-processing instructions.

Subsequent to performing the processing 202 on each problem 204 or representation thereof, the computational system may perform post-processing 208. As discussed in detail in reference to other Figures (e.g., FIGS. 3A and 3B), the post-processing 208 may, for example, include evaluating various samples or tentative responses or answers 210 to determine a solution for each iteration of solving performed on a problem, and/or evaluating various potential solutions to determine a best solution 212 for the problem 204. In some implementations, samples can be weighted. As discussed in detail in reference to other Figures (e.g., FIGS. 3A and 3B), the post-processing 208 may additionally include modifying a problem 204 based at least in part on results 214 to a previous processing for another iteration of processing. In this context, the problem includes the state. As discussed in detail in reference to other Figures (e.g., FIGS. 3A and 3B), the post-processing 208 may, for example, be performed by various processors or systems, and/or may be performed by various logical abstractions in the instructions sets. For instance, some post-processing 208 may be performed by the job manager hardware, executing job manager software, while other post-processing 208 may be executed by solver hardware executing solver specific post-processing instructions.

In some implementations, the computational system may assess the performance of different solvers on various types of problems, which may be used to refine or improve the selection of solvers for subsequently submitted problems. In some implementations, the computational system may incorporate importance sampling.

FIGS. 3A and 3B illustrate various processor readable instructions sets and processes (collectively 300), including various abstraction layers, for execution by the computational system 100 (FIGS. 1A and 1B) in problem solving, according to the presently described systems, devices, articles and methods.

Server instructions 302 may be executed, for instance via server hardware 110 (FIGS. 1A and 1B) to implement a server, for instance a Web server. The Web server allows the submission of problems of various types, as well as providing the results and/or solutions to the submitted problems. The Web server may queue the submitted problems 304 for solution via pre-processing, processing and post-processing.

A set of job manager instructions 306 may be executed, for instance via job manager hardware 112 (FIGS. 1A and 1B) to implement a job manager. The job manager may perform job management on submitted problems via the problem queue, via pre-processing and post-processing. It may also cause the processing of problems or the processing of representations of problems by one or more solvers via one or more solver resources 130, 140, 150, 160, or 170 (FIGS. 1A and 1B).

The job manager may verify a format of each submitted problem, determining whether the problem is suitable for solving via the computational system. The job manager may identify the most appropriate solver(s) for each submitted problem. As previously explained, the job manager may use information about previous attempts to select portfolios of solvers to run in parallel based on problem type or features. In some instances, the job manager may select two or more solvers for a particular problem, run the selected solvers in parallel and return an answer. Where the job manager may gather results from the processing by the solvers, the job manager may select a best answer. A best answer may be, for instance, an answer from the solver that finishes first with a satisfactory solution, or an answer from the solver that produces the best or closest solution within a fixed time. Additionally, the job manager may slice jobs and handle high level communications between various ones of the solvers.

In particular, the job manager instructions 306 may include a format checker set of instructions 308. The format checker set of instructions 308 performs pre-processing on each submitted problem, analyzing the submitted problem to determine whether the submitted problem is a suitable type of problem for the computational system. If the submitted problem is not a suitable type of problem for the computational system, the format checker set of instructions 308 may cause an appropriate notification to be provided to the end user 102 (FIGS. 1A and 1B) or end user device 104 (FIGS. 1A and 1B) which submitted the respective problem, for example via the Web server instructions 302.

The job manager instructions 306 may include a multiple representation generator set of instructions 310. The multiple representation generator set of instructions 310 performs pre-processing on each submitted problem, producing multiple representations of the submitted problem.

The job manager instructions 306 may include a type dependent task dispatcher set of instructions 312. The type dependent task dispatcher set of instructions 312 causes the various representations of the submitted problem to be sent to solvers for solving. The type dependent task dispatcher set of instructions 312 may, for example, select an appropriate one or more solvers for each submitted problem, the solvers selected from a plurality of available solvers. Selection of appropriate solvers may include selection of specific solver methods as well as selection of specific types of hardware resources (e.g., quantum processor 130, microprocessor 140, FPGA 150, DSP 160, GPU 170 (FIGS. 1A and 1B)) to execute the selected solver methods. Other suitable hardware resources such as an Application Specific Integrated Circuit (ASIC) can be used to execute the selected solver methods.

The job manager instructions 306 may include a selection solution set of instructions 314. The selection solution set of instructions 314 performs post-processing on results or solutions for each submitted problem, producing a best result or best results from the returned results. The selection solution set of instructions 314 may employ a variety of techniques in selecting a best solution, which are generally discussed herein. For example, one technique may include selecting the median solution from a plurality of solver iterations executed on the particular problem.

The job manager instructions 306 may include a modify problem set of instructions 316. The modify problem set of instructions 316 may modify a problem based on results or samples from a previous iteration of processing or solving performed on the problem. As such, the modify problem set of instructions 316 may be considered post-processing since information from a previous iteration is being used to refine the problem or representation of the problem, and is illustrated as such in FIGS. 3A and 3B. The modify problem set of instructions 316 may also be considered pre-processing, since the problem is being modified or re-represented for solving via one or more solvers. The denomination of the modify problem set of instructions 316 as either pre-processing or post-processing should not be considered limiting.

The job manager instructions 306 may optionally include an assess and improve selections set of instructions 318. The assess and improve selections set of instructions 318 may employ various techniques. Such may, for example, improve subsequent selection of solvers for subsequently submitted problems. As such, the assess and improve selections set of instructions 318 may be considered post-processing since information from a previous iteration is being used to refine the problem or representation of the problem, and is illustrated as such in FIGS. 3A and 3B. The denomination of the assess and improve selections set of instructions 318 as either pre-processing or post-processing should not be considered limiting.

The job manager can perform computationally heavy work (e.g., ranking to predict solver performance, generating multiple representations of a submitted problem, etc.). Other operations performed by the job manager such as pre-processing operations relative to the solver (e.g., format check) and post-processing operations relative to the solver (e.g., selecting a solution or best solution) tend to be more simplistic compared to pre-processing and post-processing operations performed by the solvers.

The job manager 306 may be considered as an abstraction layer in an overall computational scheme for the computational system 100. Thus, while some functions are illustrated in FIGS. 3A and 3B as being performed via the job manager 306, in some implementations, those functions could be performed by another abstraction layer or set of processor readable instructions. Thus, the denomination of a function or set of processor readable instructions as being within the job manager 306 should not be considered limiting.

A set of interface conversion instructions 320 may be executed, for instance via solver hardware 130, 140, 150, 160, or 170 (FIGS. 1A and 1B). The interface conversion instructions 320 may be specific to the selected solver(s), and may convert the representations of the problem into a format or form suitable for the selected solver(s). The set of interface conversion instructions 320 prepare the problem for the processing or solving thereof via the respective solvers. Therefore, the set of interface conversion instructions 320 are denominated as forming part of the pre-processing portion of the computational system 100 (FIGS. 1A and 1B).

A set of solver instructions 322a-322d (collectively 322) may be executed, for instance via solver hardware 130, 140, 150, 160, or 170 (FIGS. 1A and 1B), to process or solve the pre-processed problems. As previously noted, the job manager instructions 306 may select the specific solver or solvers 322 for any particular problem. Example solvers include QUBO solvers 322a, satisfiability solvers 322b, graphical model solvers 322c, etc. 322d.

While not intended to be limiting, a number of solver methods and techniques are set out below. The solvers (i.e., solver instructions 322 as executed by the solver hardware resources such 130, 140, 150, 160, or 170) of the computational system 100/300 may implement any one, more or all of these solver methods or techniques. The computational system 100/300 may run a given problem by exploiting multiple solver software resources on various solver hardware platforms. The solvers may include sub-solvers running on different platforms, which may be ultimately responsible for solving the jobs or problems.

Given a problem of a particular format, the computational system 100/300 may provide alternative types, formats or classes of the problem to initiate the solving of the problem. The computational system 100/300 may be capable of solving a variety of different types or formats of problems. Two types, formats or classes of problems are quadratic unconstrained binary optimization ("QUBO") problems and satisfiability (SAT) problems. Another type, format or class of problems is graphical model (GM) problems. A graphical model encodes conditional independence that exists amongst variables of the problem where each variable represents a set of qubits coupled together as a chain. The graphical model problem allows for the application of additional techniques or methods at the level of sets or chains.

A number of techniques which may be employed by the computational system for solving QUBO, SAT and/or graphical model problems are discussed below.

Global Equilibrium Search (GES)

GES is a meta-heuristic method that shares some similarities with simulated annealing methods or approaches. The GES method accumulates a compact set of information about the search space to generate promising initial solutions for various techniques that require a starting solution, such as local search or tabu search. The GES method is applicable to many discrete optimization problems: QUBO, MAX-SAT, QAP etc. and provides state-of-the-art performance in terms of both computational time and solution quality. The GES method can be naturally extended for parallel computing as the GES method performs search simultaneously in distinct areas of the solution space.

The Standard Simulated Annealing (SA) method is a memoryless optimization approach in which the transitions between solutions are independent from the previous search states. The GES method attempts to mitigate this shortcoming by using an adaptive memory structure to collect information about visited solutions, using this knowledge to control future transitions.

One variation of the SA method is to provide weights corresponding to the importance of exploring particular areas in the energy landscape of the problem. Such an approach, referred to as "annealed importance sampling," may allow the system to avoid becoming biased to local optima and thus perform a more complete search.

One variation of local search may involve seeding quick runs of simulated annealing, using the samples returned by the quantum processor hardware. This approach should be strictly better than a purely classical approach, and if implemented with coordinating or overlapping of processing and post-processing, should take no more than twice as long as Warhol simulated annealing, assuming the quantum processing is allowed to run no longer than the classical method. Where the quantum processor hardware returns more samples than can be subject to Warhol simulated annealing in the allowed time, a subset with the lowest energies can be used as the seed.

The computational system 100/300 may employ post-processing via one or more FPGAs or GPUs to automatically fix quantum processing hardware solutions as the hardware solutions are read from the quantum processor hardware. It is preferable if such post-processing does not add or does not substantially add time to a duty cycle of the computational system. In other words, it is preferable that the post-processing takes less time than a single solution readout. For example, with current quantum processors the post-processing time should be about 0.1 ms or less. The processing time for future quantum processors may be even less. Thus, other post-processing options may be employed, for example, searching via a breadthwise Hamming distance, or greedily by energy.

When using GPUs, matrix-matrix operations on batches are much more efficient than matrix-vector operations on single samples. Thus, it may be advantageous to post-process an entire sampling batch at a time, rather than sample by sample.

Iterated Tabu Search (ITS)

The ITS approach is based on the multistart tabu search method, however the starting solutions are not generated randomly but are instead perturbed in a specific way from found "good" solutions. The perturbation ensures that the hardware implementing the method moves to a different region of a solution space while attempting to preserve "good" patterns in the solution vector.

Fast Semi-Definite Programming (SDP)

An approximation may be generated based on a SDP formulation of a QUBO. The dual problem of a semidefinite relaxation of the original QUBO is solved and the obtained (continuous) solution is then discretized using some simple heuristics. The method may be faster than conventional SDP formulation, however it is unclear how fast this approach may be when compared to tabu-search type of methods.

Devour, Digest, Tidy-up Heuristic (DDT) The DDT approach employs a greedy heuristic where at every step certain bits of the solution vector are fixed based on a certain criteria. No more than 2 bits can be fixed at a time. Once a bit is fixed, that bit cannot be flipped again. Therefore, the set of possible modifications to a solution in DDT is a subset of possible modifications in a local search method with a size 2 neighborhood. Each move picked by the DDT procedure or method corresponds to an improved solution, however said improved solution does not necessarily correspond to the best solution in the neighborhood as not all possible moves are considered. Once a move is made, the corresponding bits of a solution are made "tabu" forever, eliminating therefore a subset of possibly improving moves.

Therefore, the DDT procedure is likely to produce worse quality solutions than a simple local search, but such an approach may return results more quickly. In some implementations, the DDT may be used to generate fast initial solutions for other methods, fast initial solutions which are better than just random initial solutions. The DDT approach is likely more suited to large scale problems.

Hybrid Metaheuristic Approach (HMA)

The HMA is based on principals similar to those in GES. The method normally consists of two "levels" of operation or two methods. A lower level method is designed to intensively explore a specific area of the solution space, taking the form of a conventional local-search based method (e.g., tabu search). An upper level method receives the information obtained by the lower level method and then guides and coordinates the distribution of search efforts across the solution space, e.g., tries to identify promising areas, decides which of those promising areas to explore and to what extent to explore. The upper level method runs the lower level method starting from solutions the upper level method determines. The upper level method maintains an adaptive memory structure holding information about the solutions encountered by the HMA method during the search.

In some implementations, the upper level method is implemented as an evolutionary type of technique. A set of best diverse solutions found during the search is maintained and a new starting solution for a lower level method is picked by combining components from two "parent" solutions from this set. The combining strategy is implemented via path-relinking. The new solutions obtained by lower level methods are evaluated based on their "goodness" and are either added to an elite set of the solutions or discarded. The "goodness" of a solution may be defined by combining both an objective function value and the diversity from the solutions that are already in the elite set. The distance between two solution vectors may be defined simply by the Hamming distance, or more creatively by taking into account a contribution of each variable to the objective function value (e.g., how much would the objective value change if that variable were flipped). The lower level method may be implemented with a tabu search.

Low-Treewidth Large Neighborhood Local Search (LTLNLS)

Sparse QUBOs may be approached using an LTLNLS technique. Starting from an initial configuration, a subset of variables having low tree-width are identified and minimized exactly within this subset. The precise subset of variables can be dynamic with low-treewidth subgraphs determined by favoring certain interactions over others (e.g., interactions that have not yet appeared within any tree).

Blocking and Collapsing

The LTLNLS approach can be generalized as described in the paper: Venugopal, Deepak; Gogate, Vibhav, *Dynamic Blocking and Collapsing for Gibbs Sampling*, available via the Web at www.hlt.utdallas.edu/~vgogate/papers/uai13-2.pdf. This approach applies a large neighborhood local search (called, "blocking," in the paper) in combination with variable elimination (called, "collapsing," in the paper). For example, in the case of a bipartite graph, half of the variables may be eliminated analytically due to the natural occurrence of two disjoint sets.

Parallel Tempering

An efficient implementation of parallel tempering may also be included and may include defining an appropriate set of temperatures (usually including one lower temperature and one higher temperature) from which to sample multiple chains. This approach allows for an exchange of information between runs conducted at different temperatures and may provide solutions obtained from a more complete survey of the energy landscape of the problem. An approach related to parallel tempering is simulated tempering, wherein only one chain is considered.

Pre-Processing Routines

The pre-processing procedure proposed in a thesis authored by Gabriel Tavares, 2008, available from Rutgers Electronic Theses and Dissertations service, or via the Web by searching for rutgers-lib-25771-PDF-1.pdf, uses ideas from DDT and other one-pass methods to fix some of the variables in the problem to 0 and 1. This proves that an optimal solution must have variables of those values. The approach also derives some relations between variables (e.g., equalities). This again proves that such relations must be present in an optimal solution. The procedure may help to reduce the effective dimensionality of the problem and may improve computational times.

A set of resource manager instructions 324 may be executed, for instance via resource manager hardware 120 (FIGS. 1A and 1B) to implement a resource manager. The resource manager may perform resource management for operation of the solvers via various ones of the solver hardware resources 130, 140, 150, 160, or 170 (FIGS. 1A and 1B). For example, the resource manager may parcel out and/or schedule hardware resources (e.g., computational time on hardware resources) to the various solvers 322 as processes 326a-326e (fifteen illustrated in FIGS. 3A and 3B, only five called out) execute on the solver hardware resources 130, 140, 150, 160, or 170 (FIGS. 1A and 1B).

A set of post-processing instructions 328a-328h (only eight shown, collectively 328) may be executed, for instance via solver hardware 130, 140, 150, 160, or 170 (FIGS. 1A and 1B). The post-processing instructions 328 may be specific to the selected solver(s), and convert the samples or results of the processing on the problem or problem representation into a solution. The post-processing instructions 328 operates on the output (e.g., samples, results) of the processing by the solvers and thus is denominated as forming part of the post-processing portion of the computational system 100.

A heuristic optimizer working over a minor-embedded problem often returns proposed solutions that are either locally non-optimal or not in the code space (i.e., do not realize embedding chain fidelity). For this reason, the computational system provides a hybrid optimization approach employing a "black box" heuristic optimizer and an efficient heuristic post-processor that cleans and properly encodes the results of the heuristic optimizer. The term, "black box," is employed to indicate that in many instances the end users do not need to be aware of what specific heuristic optimizer is employed or how the heuristic optimizer operates.

Post-processing is performed to determine the solutions of the unembedded problem that correspond to the proposed solutions of the embedded problem returned by the heuristic optimizer. The most straightforward way of performing this post-processing is by rejection, i.e., by rejecting any sample returned by the heuristic optimizer that is not in the domain of the embedding mapping (e.g., any sample with a broken chain).

Another approach is majority vote. There are other computationally inexpensive and effective post-processing schemes. For example, for post-processing of the solution of SAT problems, a greedy descent and local search may be employed. Also available is variable clamping post-processing.

While not intended to be limiting, a number of post-processing methods and techniques are set out below. The post-processing instructions 328 as executed by the solver hardware resources 130, 140, 150, 160, and 170) of the computational system 100/300 may implement any one, more or all of these post-processing methods or techniques. The computational system 100/300 may run two or more of these post-processing methods in parallel with one another.

Majority Vote

Majority voting instructions 328a may implement a majority voting method, for instance where the most common sample or result is selected as the best solution. Alternatively, a majority voting method may be directed to error correction aiming to preserve the encoded sub space. For example, in the case of a broken chain of ferromagnetically coupled qubits, the most commonly occurring value (the "majority"), assuming repetitive encoding, is determined to be the correct value. Such an approach is typically easy and quick to implement, however it may be susceptible to error when the number of values considered is low, resulting in a potentially high likelihood that an incorrect value is determined to be correct. As in the case of any post-processing strategy where limited effort is expended, the quality of the results provided by a majority vote method may be unduly limited. Thus, other post-processing methods may be employed separately or in conjunction with a majority voting method.

Local Search

Local searching instructions 328b may implement a combination of majority voting with a greedy local search. After applying majority vote or another post-processing method, the results may be refined by using a local search method of arbitrary complexity (e.g., tabu search) in the unembedded problem space, using the hardware's proposed solutions as initial conditions. Provided that a running time of the local search method is limited, this can provide a significant improvement in a small amount of time. The local search method may or not be aware of the structure of the unembedded problem, depending on the specific application. For example, a local search SAT solver can be used as a post-processor for a SAT instance, and its knowledge of the problem structure can make it more effective than a context-free solver.

Markov Chain Monte Carlo (MCMC) The set of MCMC instructions 328c may implement a Markov Chain Monte Carlo method.

In sampling-based use cases, the goal is to draw (classical) Boltzmann samples at the programmed Ising energy function. Mapping of most real world problems into a quantum processor whose topology implements a bipartite graph often requires increasing a connectivity on the chip or quantum processor. Connectivity may be increased by implementing the concept of logical qubits or "chains" of qubits, where a plurality of qubits are strongly coupled together and represent a single problem variable, and denominated herein as a logical qubit since the plurality of physical qubits in any given chain operate or function as a single qubit, albeit with a higher connectivity that would otherwise be available to a single physical qubit. For example, see U.S. patent application Ser. No. 14/339,289, filed Jul. 23, 2014, now US Patent Application Publication 2015-0032993. The logical qubits or chains of strongly coupled qubits may support long range interactions in the energy function. Typically, however, we are not interested in excited states which break chains since chains are an artifact required for implementation on a quantum processor whose topology implements a bipartite graph. Unlike the previously described optimization examples, the post-processing involving MCMC attempts to make samples approach a more Boltzmann distribution by running block Gibbs sampling on hardware samples. This "cleans" up hardware samples, thereby making further downstream processing more likely to succeed.

Markov Chain Monte Carlo methods may perform better the closer the samples resemble a Boltzmann distribution. At little additional cost, samples which approach a Boltzmann distribution can be obtained, making subsequent processing more effective. This may enable better estimates for MC approximations of the partition function, the number of ground states, expectations, etc.

Another approach is to run extended MCMC chains, initialized based on samples returned from a quantum processor, such as one or more of quantum processors 132 (FIGS. 1A and 1B), from which multiple samples are drawn. Assuming that multiple gauges are run on the same problem, the programming time for each new gauge is significant, and annealing and readout, e.g., of $10^4$ samples, is far from instantaneous. During this time, a GPU or FPGA implementation, such as GPUs 172 or FPGAS 152 (FIGS. 1A and 1B), could run block Gibbs sampling initialized from the last batch of ten thousand ($10^4$) samples. Assuming that many iterations of block Gibbs sampling can be run in the time required to fully extract the results of the next gauge, multiple decorrelated samples produced by this classical MCMC could be returned to the user for each sample produced by the hardware.

Metropolis Sampling

Metropolis sampling (also known as Metropolis-Hastings) is an example of a MCMC method. Metropolis sampling can be used to cause the sample distribution to be closer to the target Boltzmann distribution. The post-processing operation, in this case, uses raw solutions as seeds to a process that randomly explores the solution neighborhoods to create a new sample closer to the target distribution. Ideally, the sample means after Metropolis sampling closely match the corresponding sample means of the parameterized Boltzmann distribution.

Greedy Descent

Greedy descent instructions 328d may be employed after the application of any other post-processing method to further refine the results. The greedy descent method iteratively makes bit flips that improve an objective or evaluation function in the proposed solutions until no more bit flips are possible. A method for performing greedy descent with respect to a quantum processed solution may, for example, include instructions to:
1. Determine a set of qubits which can improve a solution when the qubits are flipped individually;
2. Randomly flip each of these qubits with 50% probability;
3. Repeat the process until it converges or reaches a maximum number of iterations (e.g., five times the number of qubits);
4. Return the best solution found during the descent.

Local Field Voting

Local field voting instructions 328h may implement a local field voting method, an approach subsumed by greedy descent. If the hardware resources (e.g., microprocessor 140, FPGA 150, DSP 160, GPU 170 (FIGS. 1A and 1B)) return a solution including a broken chain whose neighbouring chains are all intact, the optimal value of the respective variable in the broken chain may be decided based on the fixed value of the analogous variables in the neighbouring chains. The approach can also be used if some neighbouring chains are not intact. The method can be iterative.

Variable Clamping

Variable clamping instructions 328e may implement a variable clamping method. If the hardware resources (e.g., microprocessor 140, FPGA 150, DSP 160, GPU 170 (FIGS. 1A and 1B)) return solutions involving chains that are always or almost always intact and that favour one particular configuration over the other, we may "clamp" variables in the chain and re-run the problem (i.e., hold one or more variables at particular values while allowing other variables to accommodate the fixed variables). This approach may be re-run multiple times until satisfaction criteria are met. For example, the system may: (1) apply a local h to the members of the chain in order to make it inflexible, or (2) set it as a constant in the Ising problem, and convert the incident J entries to h entries on those chains coupled with the variable being clamped. The system can repeat this approach until all chains are satisfactorily decided.

Variable Branching

Variable branching instructions 328f may implement a variable branching method. If the hardware resources (e.g., microprocessor 140, FPGA 150, DSP 160, GPU 170 (FIGS. 1A and 1B)) return a solution including at least one variable that is not satisfactorily decided, we can branch on it, splitting the problem into two sub problems: a first sub problem where the variable is assumed to take a particular binary value, and a second sub problem where the variable is assumed to take the opposing binary value from that in the first sub problem. This method is feasible under certain circumstances including implementations where the method only branches on a very small number of variables.

Rejection

Rejection instructions 328g may implement a rejection method for instance, where any sample from the heuristic optimizer that is not in the domain of the embedded mapping (i.e., any sample with a broken chain) is rejected or not considered further. In cases where the probability of rejecting a sample returned is high, e.g., due to broken chains, alternative approaches as discussed herein to perform error correction or to repair the broken chain may be employed.

EXAMPLE

Some exemplary satisfiability (SAT) problems include: NAE3SAT (Not-All-Equal-3-SAT) and 2in4SAT (2-in-4-SAT). Given a conjunction of clauses, each containing exactly three literals, a NAE3SAT problem can be defined as finding an assignment such that each clause contains at least one true and at least one false literal. Given a conjunction of clauses, each containing exactly four literals, a 2in4SAT problem can be defined as finding an assignment such that each clause contains exactly two true and two false literals.

NAE3SAT and 2in4SAT are two types of constraint satisfaction (i.e., satisfiability) problems that may be embedded on quantum processor hardware. Chains of qubits or logical qubits may be employed to embed such problems in a quantum processor whose topology implements a bipartite graph, however there is a limit on the size of a problem that may be embedded. The computational system 100 (FIGS. 1A and 1B) may employ decomposition on problems that would otherwise be too large to be embedded on the quantum processor hardware.

The various post-processing techniques described above are also particularly useful in improving results which include broken chains. A number of factors can cause a chain to break, for example, a coupling strength between qubits of the chain may be set to a value that is too low to sustain the chain. Consequently, in practice, there are often broken chains in results returned from hardware resources. Post-processing techniques may improve such results, by for example, rejection (i.e., discarding results including a broken chain) or by error correction.

Also for example, majority voting post-processing may be employed in error correction, e.g., to repair broken chains by assigning the corresponding logical variable the value given by the majority of constituent chain members where any ties between values may be decided randomly. Also for example, greedy descent post-processing may be applied after or in conjunction with majority voting post-processing. Such an approach may apply single bit flips in the unembedded problem and select those configurations which improve an objective or evaluation function. These flips are made greedily, until no more local improvement is possible.

As a further example, local search post-processing may be employed. For instance, a local search method may be invoked to further improve or refine results received from a hardware resource. The running time of the local search method should ideally be relatively small.

For instance, if applying a local change involves deciding how to assign a logical variable represented by a chain X, each neighboring chain Y asserts a value J on X, which can be inferred based on either Y's majority vote or by Y's proportional representation.

The above "guessing" approach may be taken further, reducing the problem to an Ising model based on only variables represented by broken chains. If there are, for instance, two broken chains that have at least one connection between each other, an Ising interaction may be added between corresponding logical variables, and the reduced Ising problem may then solved as part of post-processing in software.

Other examples of post-processing operations that could be employed include a genetic algorithm (a search heuristic that mimics natural selection), extended ensemble (an example of MCMC), and simulated annealing.

Post-processing operations can also be used for enumeration i.e. when the goal is to find (or count) all optimal solutions to a problem rather than finding only a single optimal solution. Many of the optimization post-processing techniques described herein apply also to enumeration.

Furthermore, in one approach, the computational system finds an optimal solution, and then find additional solutions using single bit flips and breadth-first-search. Bit flips can be performed in a similar manner to greedy descent, accepting a move if the energy is unchanged, and generating a new solution. Breadth-first search or depth-first-search can be used to find and record all solutions that can be reached using the single bit flips.

Statistics from the optimal solutions found in sampling can be used to provide estimates or bounds on the total number of optimal solutions. The approach can be applied recursively.

The post-processing may occur on a variety of different hardware, at various points in the computational system. For example, the post-processing may occur on the quantum processor application programming interface (QPAPI) level, the SAPI level, or at the non-quantum processor level (e.g., FPGAs). The QPAPI is a Web services API that exposes quantum processor instructions as Web services.

As indicated by the above examples, mapping of most real world problems into a quantum processor whose topology implements a bipartite graph requires increasing the connectivity on the chip, which is currently done by introducing chains, as previously described. As previously discussed, in reality, chains may often break for a variety of reasons.

When breakage on the chain occurs, the corresponding sample could either be discarded or mapped to "a close feasible state", (i.e., a state with no breakage). The former choice leads to a wasting of samples before a feasible state is achieved. The latter option introduces some overhead in order to fix or improve the sample through post-processing, as previously described. For example, majority voting on the chain may be performed to map the broken chain to their closest (in terms of Hamming distance) feasible state.

In practice, some of the samples returned by the hardware (e.g., quantum processor) may not be locally optimal. For optimization problems where the goal is to determine a global optima or at least a good local optima, only locally optimal states are considered. Similar to broken chains, non-locally optimal samples offer two options: i) discard the samples, or ii) perform a local search to fix the samples. With regards to the latter option, an example of a post-processing approach to map a non-locally optimum state to a candidate solution is to run a local search to find a close locally optimal state.

In an alternative approach, it may be possible to fix broken chains and non-locally optimal samples without introducing any overhead. This may be achieved by post-processing the samples as the samples arrive. Since the samples arrive one at a time, the post-processing could be performed while the next sample is being generated. The post-processing of the samples may, for instance, occur on one or more FPGA communicatively coupled to the source of the samples (e.g., quantum processor).

The SAPI and QPAPI may be configured to accommodate such an approach, for example, through the use of a flag which signals that a sample returned from the hardware is to be post-processed in order to ensure that the sample is locally optimal. By default, the flag may be set to true (i.e., every sample is flagged to be post-processed to ensure it is locally optimal). Samples with broken chains may be flagged. Flagged samples may be post-processed to ensure local optimality. For example, broken chains flagged as non-locally optimal may be passed to a non-quantum hardware resource (e.g., FPGA) and majority voting may then be performed on the chain to repair the broken chain, and additionally, a local descent from the repaired chain may be invoked.

In another approach to repair a broken chain, the value (e.g., 0 or 1, +1 or −1) that minimizes the energy is selected. This approach can be applied greedily or recursively, similar to majority vote. This approach is similar in some respects to following the local field, and is optimal in special cases (i.e., it will always provide a minimum energy solution if broken chains are not neighbors).

If the problem being solved on the quantum hardware is a CSP type problem with small local constraints, a chain typically breaks due to taking on different values in an attempt to satisfy different constraints. For example, in NAE3SAT problems, a hardware resource such as a quantum processor might break a chain by setting a variable to 0 to satisfy a first clause and setting the same variable to 1 to satisfy a second clause. In this case, resolving chains by looking at values of neighboring chains is unlikely to be a useful approach. NAE3SAT and 2in4SAT problems have a relatively direct conversion to an Ising problem. 3SAT, however, could immediately benefit from a strategy in which a hardware result is mapped to a "nearby" valid 3SAT answer.

Additionally, the QPAPI or the quantum processor may measure a local excitation value, for example for determining for a given set of solutions the percentage of spins which can be flipped in isolation to improve the energy. This value provides the opportunity to improve the answers produced by post-processing. This value also gives provides an opportunity to measure error susceptibility of a particular problem or type of problem, and to measure possible readout errors. This may employed to make better selections for solving future problems.

Optionally, a set of instructions 330 may be executed, for instance via hardware resources (e.g., microprocessor 140, FPGA 150, DSP 160, GPU 170 (FIGS. 1A and 1B)) to cause a coordinating of post-processing operations with processing operations (i.e., generation of samples by the quantum processor(s)). The set of instructions 330 may cause the post-processing operations to at least partially, or even fully overlap with the generation of samples. For instance, the set of instructions 330 may cause post-processing to be performed on an nth sample or result from the quantum processor while the quantum processor is generating an n+1th sample or result. The set of instructions 330 may time the post-processing such that each iteration partially overlaps with iterations of the solving. The set of instructions 330 may control the post-processing for an n sample or result to complete before or at the time of completion of generation of an n+1th sample by the quantum processor. This approach can significantly reduce overall time to produce an answer or solution.

For example, coordination of processing and post-processing operations may be applied in running extended MCMC chains, initialized based on the samples from the quantum processor hardware, from which multiple samples are drawn. For instance, if running multiple gauges on the same problem, the programming time for each new gauge is significant, and annealing and readout of, for example ten thousand ($10^4$) samples is far from instantaneous. During this time, a GPU or FPGA implementation could run block Gibbs sampling initialized from the last batch of ten thousand ($10^4$) samples. Assuming that many iterations of block Gibbs sampling can be run in the time required to fully extract the results of the next gauge, multiple decorrelated samples produced by this classical MCMC could be returned to the user for each sample produced by the quantum processor hardware. Preferably, the post-processing operations will not add time to a duty cycle of the computational process, the post-processing operation taking less time than a single solution readout from the quantum processor (e.g., less than 0.1 ms). Since GPU matrix-matrix operations on batches are more efficient than matrix-vector operations on single samples, it may be advantageous to post-process an entire sampling batch at a time rather than individual samples.

In many instances, a quantum processor can very rapidly produce high quality or reliable results. Briefly put, the quantum annealing hardware can very quickly find solutions that are within a small difference epsilon ϵ from optimal, but because of ICE and noise, the cost getting from ϵ to an optimal solution can be relatively high. The small difference ϵ is a number based on a model of errors due to ICE; and is proportional to $\sqrt{M}$, where M is the number of qubits and couplers in the hardware graph. The system may take advantage of this ability of the quantum hardware by using a hybrid computing approach in which one or more quantum processors initially determine a reduced set of solutions, which are then post-processed to further increase a reliability of the solutions, and for instance determining a best solution.

It is possible to let a quantum processor evolve for a long time to reach the ground state of the problem Hamiltonian or let the quantum processor evolve for less time and reach a different state short of the ground state. This different state may approximate the ground state. An analog computer including a quantum processor that finds the approximate ground state is useful. These approximate ground states can lead a computer to find the ground state using methods of post-processing described here, in a technique referred to herein as approaching epsilon. A question is how good an approximation of the ground state is needed for the results to be useful.

Solutions within a quantifiable distance of the ground state are useful approximate solutions to the problem embodied in the problem Hamiltonian. The problem Hamiltonian includes a ground state, and wherein the ground state has the lowest energy among the states of the problem Hamiltonian. However, a ground state may be degenerate or not.

Evolving the quantum processor for a time T may include evolving the quantum processor for a time T wherein the time T is not sufficient to reach the ground state of the problem Hamiltonian but is sufficient to reach a set of excited states above the ground state.

Evolving the quantum processor for a time T may include evolving the quantum processor for a time T wherein the time is sufficient to reach one or more states near the ground state of problem Hamiltonian. Here the term "near" means within an amount of energy, $E_R$, away from the ground state.

The amount of energy away from the ground state can be calculated many different ways under different assumptions. In one example, the amount of energy away from the ground state is proportional to the product of a constant, a term describing the error model, and a term describing the error in the device parameter. Devices may include qubits or couplers in the analog processor. For example, $$E_R \propto k \cdot EM \cdot ED \tag{31}$$

Here k is constant, EM summarizes the error model, and ED summarizes the error in the devices. Examples of the constant, k, are of order 1. Examples of the error model term include an expression proportional to the number of devices in the quantum processor. Examples of the error model term include an expression proportional a factor sub-linear in number of qubits, linear in the number of qubits, and polynomial in the number of qubits. For a hardware graph, examples of the error model term include terms that assume errors in the Hamiltonian of the quantum processor are uncorrelated. A summation of uncorrelated errors leads to an overall factor that is proportional to the square root of the number of terms in the summation. An example is:

$$EM \propto (M)^{1/2} \tag{32}$$

where M is approximately the number of qubits and couplers in the hardware graph. For a hardware graph of an exemplary quantum processor whose topology implements a bipartite graph, examples of the error model term include:

$$EM \propto (4N)^{1/2} \tag{33}$$

where 4N is approximately the number of qubits and couplers, in the hardware graph in terms of the number of qubits, N. For a complete hardware graph $K_N$ examples of the error model term include $$EM \propto (½)^{1/2} N^{1/2} \tag{34}$$

Examples of the error model term include an expression proportional to the number of devices. For a hardware graph of an exemplary quantum processor whose topology implements a bipartite graph, examples of the error model term include:

$$ED \propto \delta M_{AFM} I_P^2 \tag{35}$$

where δ is a value less than one and greater than zero. The balance of the expression is the maximum energy scale of the analog process and specifically shown is the energy scale for a superconducting quantum processor comprises of rf-SQUID qubits and couplers.

Examples of δ include 0.01, 0.05, and 0.1. The term δ is the error the specification of a parameters of the quantum processor. For example, for a single qubit bias term, h, the error in the bias is δh.

The computational system 100/300 may further include one or more random number generators 332 operable to produce either pseudo-random or truly random numbers. Random numbers may be useful to drive probabilistic computations, such as those in post-processing. In particular, pseudo-random numbers may be provided via a classical computer program (e.g., by calling random number generator functions provided in MATLAB, Python, etc. or a proprietary classical function). Truly random numbers may be provided by a quantum source. A quantum random number generator may generate a uniform distribution of random bits. A quantum random number generator may generate a distribution of truly random real numbers by collecting contiguous sub-sequences of bits from a distribution of random bits. Examples of a quantum random number generator include commercial devices including the qStream computing appliance from QuintessenceLabs Acton, ACT 0200, Australia and the Quantis family of computer peripherals (e.g. USB devices and PCI cards) from id Quantique SA, Carouge GE, Switzerland. For example, a quantum random number generator might take the form of an external piece of hardware (e.g., USB, PCI, PCI Express, etc.) that is integrated with a quantum processor system and/or take the form of one of the quantum processors 130 (FIGS. 1A and 1B) of the computational system 100. Any variety of random number generators may be employed.

The computational system 100/300 may further include a quantum processor error correction set of instructions 334 which performs error correction, sometimes called "shimming", of the quantum processor. The quantum processor error correction set of instructions 334 may, for example, identify biases in quantum devices toward +1 or −1 states, and correct for such bias. The quantum processor error correction set of instructions 334 may be executed by a variety of processor based devices, for instance a control system or computer associated with a particular quantum processor that is the subject of the error correction.

Figure 4:
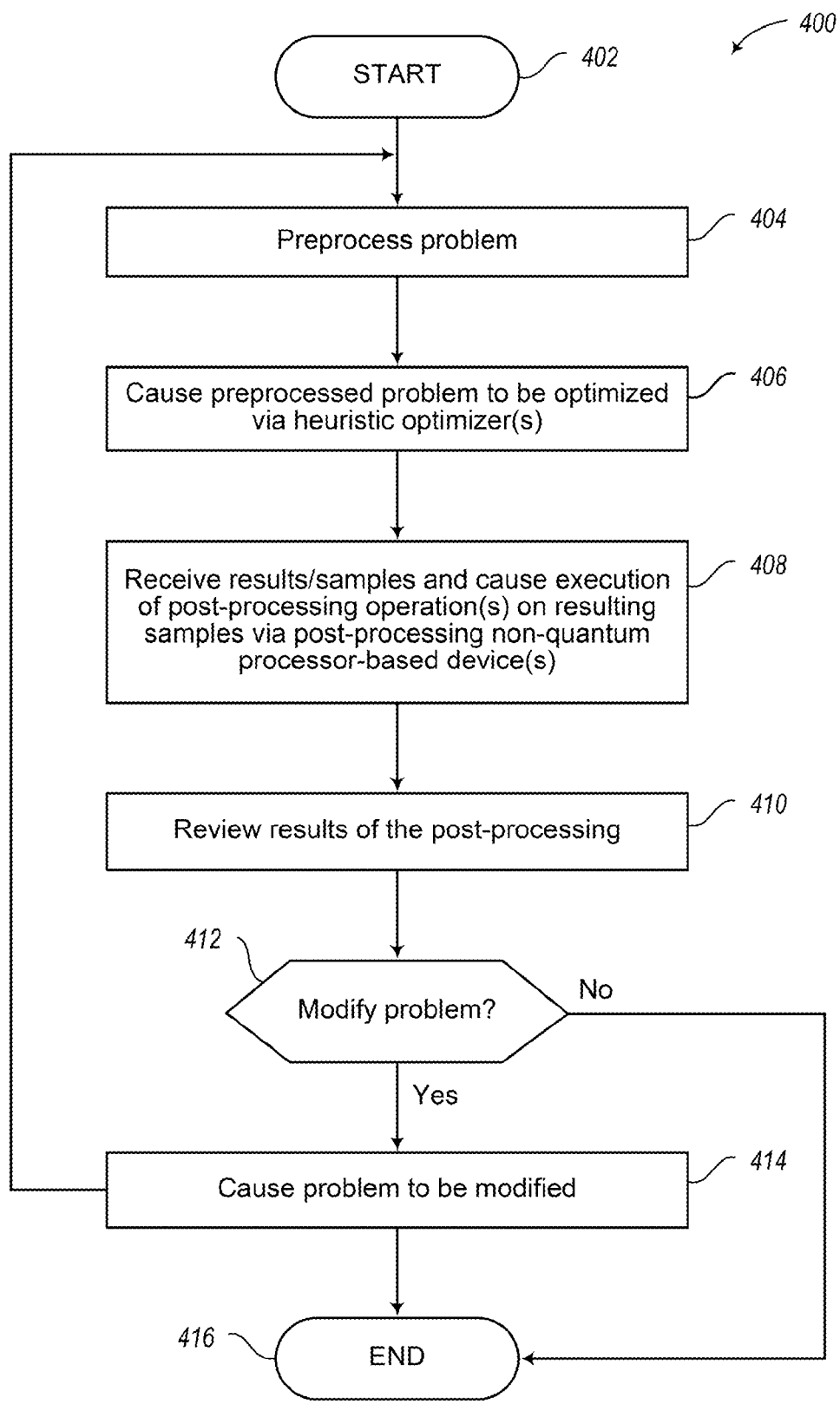
FIG. 4 is a flow diagram showing a high-level method of operation in a computational system including one or more processors to perform pre-processing, processing and post-processing on problems, in accordance with the presently described systems, devices, articles and methods.

FIG. 4 shows a method 400 of operation in a computational system, according to the presently described systems, devices, articles and methods.

The method 400 starts at 402, for example, in response to submission of a problem or in response to an invocation by another routine. The method 400, or portions thereof, may be executed by one or more processor-based components, for example via one or more processor-based controllers (FIGS. 1A and 1B) of a job manager (e.g., job manager instructions or software module 306 illustrated in FIGS. 3A and 3B), which is communicatively coupled to one or more heuristic optimizers or solvers implemented via appropriate hardware circuitry (e.g., quantum processors, non-quantum processors).

At 404, at least one processor-based controller causes execution of at least one pre-processing operation on a problem, prior to submitting the problem to one or more solvers (e.g., heuristic optimizers). Such may, for example, include checking or confirming that a submitted problem is of a format which is suitable or acceptable for various solvers executable via the system. Additionally, or alternatively such may, for example, include generating one or more representations of the submitted problem. As explained in detail below with reference to FIG. 4, such may additionally or alternatively include selecting one or more heuristic optimizers and/or hardware processors (e.g., microprocessor 140, FPGA 150, DSP 160, or GPU 170 as illustrated in FIGS. 1A and 1B) to perform the heuristic optimization on the representations of the problem.

At 406, at least one processor-based controller causes the pre-processed problem, or representations thereof, to be optimized via one or more heuristic optimizers. For example, the at least one processor-based controller may submit the pre-processed problem or representations thereof to one or more heuristic optimizers.

For example, the heuristic optimizer(s) may be executed via one or more quantum processors. The quantum processors may be selected from a variety of different types of quantum processors, for instance one or more superconducting quantum processors designed for AQC and/or quantum annealing.

Also for example, the heuristic optimizer(s) may be executed via one or more non-quantum processors. The non-quantum processors may be selected from at least one of microprocessors, digital signal processors (DSPs), graphical processing units (GPUs), and/or field programmable gate arrays (FPGAs). For instance, a heuristic optimizer may be executed by one or more microprocessors, for instance in parallel by two or more microprocessors. Also for instance, a heuristic optimizer may be executed by one or more DSPs, for instance in parallel by two or more DSPs. Also for instance, a heuristic optimizer may be executed by one or more GPUS, for instance in parallel by two or more GPUs. Also for instance, a heuristic optimizer may be executed by one or more FPGAs, for instance in parallel by two or more FPGAs. Additionally or alternatively, heuristic optimizers may be executed by one or more microprocessors and one or more DSPs, GPUs and/or FPGAs, for instance in parallel by the microprocessors and the DSPs, GPUs and/or FPGAs. Additionally or alternatively, heuristic optimizers may be executed by one or more DSPs and one or more GPUs and/or FPGAs, for instance in parallel by the DSPs and the GPUs and/or FPGAs. Additionally or alternatively, heuristic optimizers may be executed by one or more GPUs, one or more FPGAs, for instance in parallel by the GPUs and FPGAs. Any other combination or permutation of non-quantum processors may be employed which are suitable for the particular problem to be solved and the heuristic optimizer to be employed.

Also for example, the heuristic optimizer(s) may be executed via one or more quantum processors and via one or more non-quantum processors. Again, any combination or permutation of non-quantum processors may be employed which are suitable for the particular problem to be solved and the heuristic optimizer to be employed.

At 408, at least one processor-based controller receives results of or samples from the heuristic optimization(s) from the one or more heuristic optimizers executing on hardware resources (e.g., non-quantum processor(s), quantum processor(s)) and causes an execution of at least one post-processing operation on the respective samples via the at least one post-processing non-quantum processor-based device. In some implementations, one or more heuristic optimizers may be executed via one or more quantum processors, and the at least one processor-based controller then receives the samples generated via the heuristic optimization executed by the quantum processor(s). In some implementations, the one or more heuristic optimizers may be executed via one or more non-quantum processors, and the at least one processor-based controller then receives the samples generated via the heuristic optimization executed by the non-quantum processor(s). In some implementations, the one or more heuristic optimizers may be executed via one or more non-quantum processors and one or more quantum processors, and the at least one processor-based controller then receives the samples generated via the heuristic optimization executed by the non-quantum and the quantum processors. In yet other implementations, the at least one processor-based controller may itself perform the heuristic optimization, and does not receive the results of the heuristic optimization since the at least one processor-based controller already has the results of the heuristic optimization.

The post-processing operation(s) may, for example include one or more of: a majority voting post-processing operation, a greedy descent post-processing operation, a variable clamping post-processing operation, a variable branching post-processing operation, or a local field voting post-processing operation, via at least one digital processor executing corresponding instructions or software modules.

At 410, at least one processor-based controller reviews the post-processed results of the heuristic optimization. For example, the at least one processor-based controller may review the results with respect to satisfying an end condition.

At 412, at least one processor-based controller determines whether to modify the original problem based at least in part on the results of the post-processing. For example, the at least one processor-based controller may determine whether an end condition has been satisfied.

If the end condition has been determined to have been satisfied, control passes to 416 where the method 400 may terminate.

If the end condition has been determined not to have been satisfied, the at least one processor-based controller modifies the problem or causes the problem to be modified at 414. The at least one processor-based controller causes the modified problem to be optimized via one of the heuristic optimizers, for example by returning control to 404 or optionally 406. The at least one processor-based controller may return the modified problem to the same heuristic optimizer(s) used in a previous iteration. Alternatively, the at least one processor-based controller of the computational system may, for example, switch between different ones of the heuristic optimizers between various iterations performed on the problem. For instance, the at least one processor-based controller of the computational system may cause a first one of the heuristic optimizers to optimize the respective problem and a second one of the heuristic optimizers to optimize the modified problem, wherein the second one of the heuristic optimizers is different than the first one of the heuristic optimizers.

The operations of the method 400 may be repeated one or more times, iteratively modifying the problem and performing optimization on the modified problem until an end condition is reached or satisfied.

Figure 5:
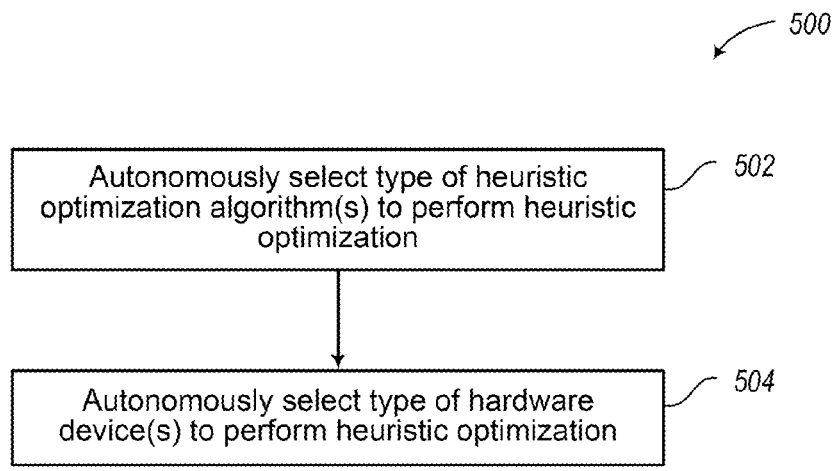
FIG. 5 is a flow diagram showing a low-level method of operation in a computational system which includes autonomous selection of heuristic optimization algorithms and hardware, in accordance with the presently described systems, devices, articles and methods, and which can be executed as part of the method of FIG. 4.

FIG. 5 shows a method 500 of operation in a computational system, according to the presently described systems, devices, articles and methods. The method 500 may, for example, be executed as part of the performance or execution of causing execution of at least one post-processing operation 408 of the method 400 (FIG. 4).

At 502, the at least one processor-based controller of the computational system autonomously selects between a plurality of types of heuristic optimization algorithms to perform the heuristic optimization.

At 504, the at least one processor-based controller of the computational system autonomously selects between a plurality of types of hardware devices to perform the heuristic optimization. In some instances, the selection of the hardware devices may be dictated by the particular post-processing approach which is chosen or employed.

Figure 6:
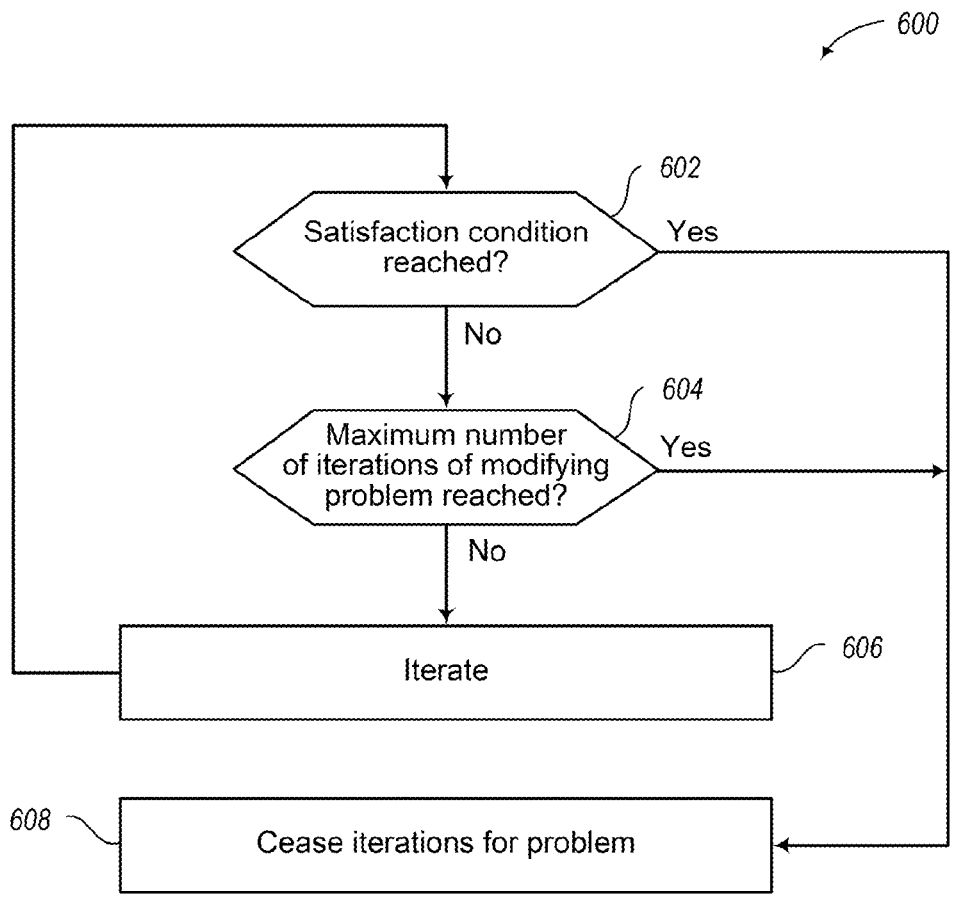
FIG. 6 is a flow diagram showing a low-level method of operation in a computational system which includes determining when to cease a number of iterations, in accordance with the presently described systems, devices, articles and methods, and which can be executed as part of the method of FIG. 4.

FIG. 6 shows a method 600 of operation in a computational system, according to the presently described systems, devices, articles and methods. The method 600 may, for example, be executed as part of the performance or execution of determining whether an end condition has been reached as part of determining whether to modify the problem 412 of the method 400 (FIG. 4).

As previously noted, at 602 the at least one processor-based controller may determine if a satisfaction condition is reached in order to determine whether to modify the original problem based at least in part on the results of the post-processing. If a satisfaction condition is reached at 602, control passes to 608, where iterations on the problem are ceased. If the satisfaction condition is not reached at 602, control passes to 604.

At 604, at least one processor-based controller determines whether a maximum number of iterations of modifying the problem has been reached. If the maximum number of iterations of modifying the problem has been reached at 604, control passes to 608, where iterations on the problem are ceased. If the maximum number of iterations of modifying the problem has not been reached at 604, control returns to 606, where the method 600 is repeated.

Figure 7:
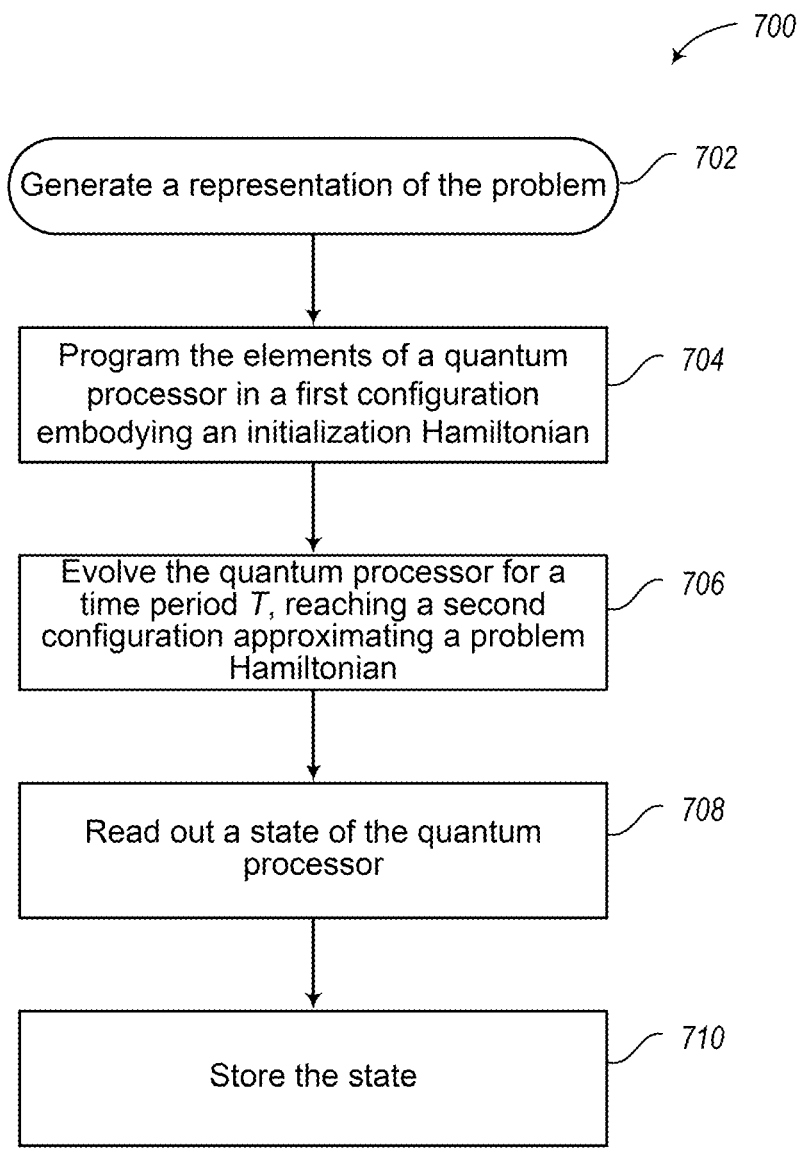
FIG. 7 is a flow diagram showing a high-level method of operation in a computational system which includes performing processing via one or more quantum processors, in accordance with the presently described systems, devices, articles and methods, and which can, for instance, be executed as part of the method of FIG. 4.

FIG. 7 shows a method 700 of using a quantum processor to determine a solution to a problem using what is denominated as a time to Epsilon approach, according to one illustrated embodiment. Method 700 includes a plurality of acts, although those of skill in the art will appreciate that in alternative embodiments additional acts may be included or some acts omitted in various applications of method 700. At 702, a representation of the problem is generated. In some examples this is done in a digital computer associated with analog computer. The representation may include, for example, a graphical representation, a binary representation, a quadratic unconstrained binary optimization representation, an Ising model representation, and the like. At 704, the elements of the quantum processor are programmed in a first configuration that embodies an initialization Hamiltonian. In some examples, this programming may be achieved using an operational subsystem including a plurality of element-specific programming interfaces. At 706, the analog computer evolves the state of the quantum processor for a time T. Evolving the state of the quantum processor may include, for example, performing a quantum computation such as an adiabatic quantum computation or an implementation of quantum annealing. The time T is long enough to bring the state of the quantum processor to within $E_R$ of the ground state. That is, the quantum processor is described by a second configuration approximating a problem Hamiltonian. The problem Hamiltonian encodes a computational problem. At 708, the analog computer reads out a state of the quantum processor. In some examples, the quantum processor may include a read out subsystem configured to read out the first solution to the problem. The state represents a solution to the problem embodied in the problem Hamiltonian. It is expected that the solution will commonly be an approximate solution, but could be the true solution. At 710, the state of the quantum processor is stored. In some embodiments, the state of the quantum processor may be stored in a computer readable/writable storage associated with the analog computer.

Figure 8:
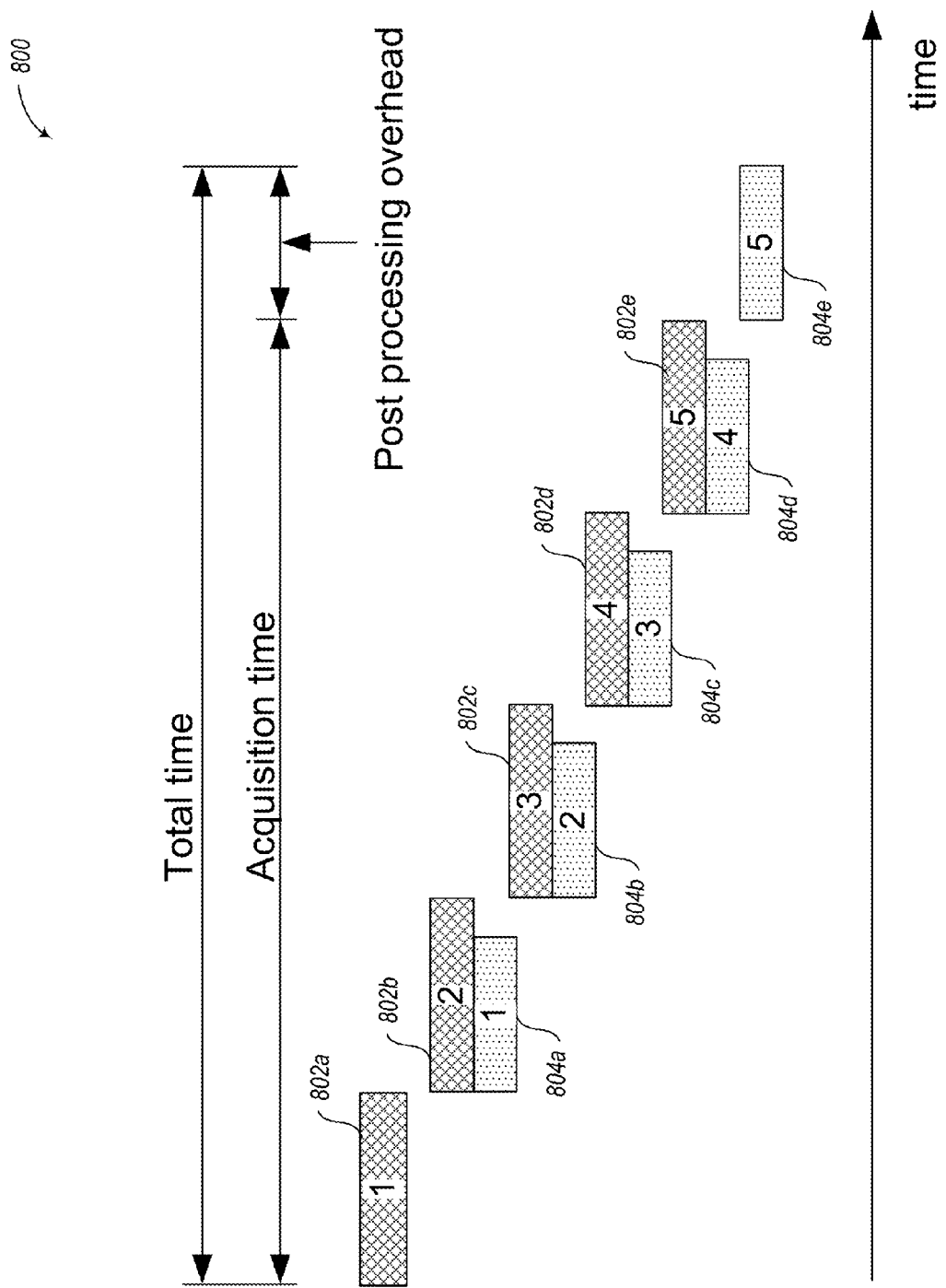
FIG. 8 is a timing diagram showing a coordinating or overlapping in execution of post-processing with processing operations in accordance with the presently described systems, devices, articles and methods.

FIG. 8 is a timeline 800 showing a coordinating of processing and post-processing operations in an overlapping manner, according to the presently described systems, devices, articles and methods.

The computational system 100 performs a plurality of processing operations 802a-802e (five shown, collectively 802) in the form of successive sample batch acquisitions. The processing operations 802 may take a variety of forms, for example adiabatic quantum processor operations on a problem Hamiltonian. Following each of the processing operations 802, the computational system 100 performs post-processing operations 804a-804e (five shown, collectively 804) on the most recent one of the previously acquired sample batches. Notably, each of the post-processing operations 804a-804e overlaps in time with a respective one of the processing operations 802. For example, the post-processing operations 804 occur during the processing operations 802. This approach advantageously reduces the overall or total time to determine a solution or best solution, the overall or total time being the sum of the time to perform the processing (e.g., acquisition time to acquire samples) and post-processing overhead which may for instance be equal to the time to post-process a single sample or a single batch of samples.

As illustrated in FIG. 8, each post-processing operation may be shorter than a respective subsequent one of the processing operations with which the post-processing operation overlaps. In other implementations, each post-processing operation may be of equal, approximately equal, or shorter duration as a duration of a respective subsequent one of the processing operations with which the post-processing operation overlaps. While less advantageous, in yet other implementations, each post-processing operation may be of longer duration than a duration of a respective subsequent one of the processing operations with which the post-processing operation overlaps. In some implementations, the time to acquire samples or batches of samples may also include time to pre-process a problem.

While the various processing operations are illustrated each having the same duration, in some implementations, the durations of the respective processing operations may differ from some or all of the other ones of the processing operations. While the various post-processing operations are illustrated each having the same duration, in some implementations, the durations of the respective post-processing operations may differ from some or all of the other ones of the post-processing operations.

Figure 9:
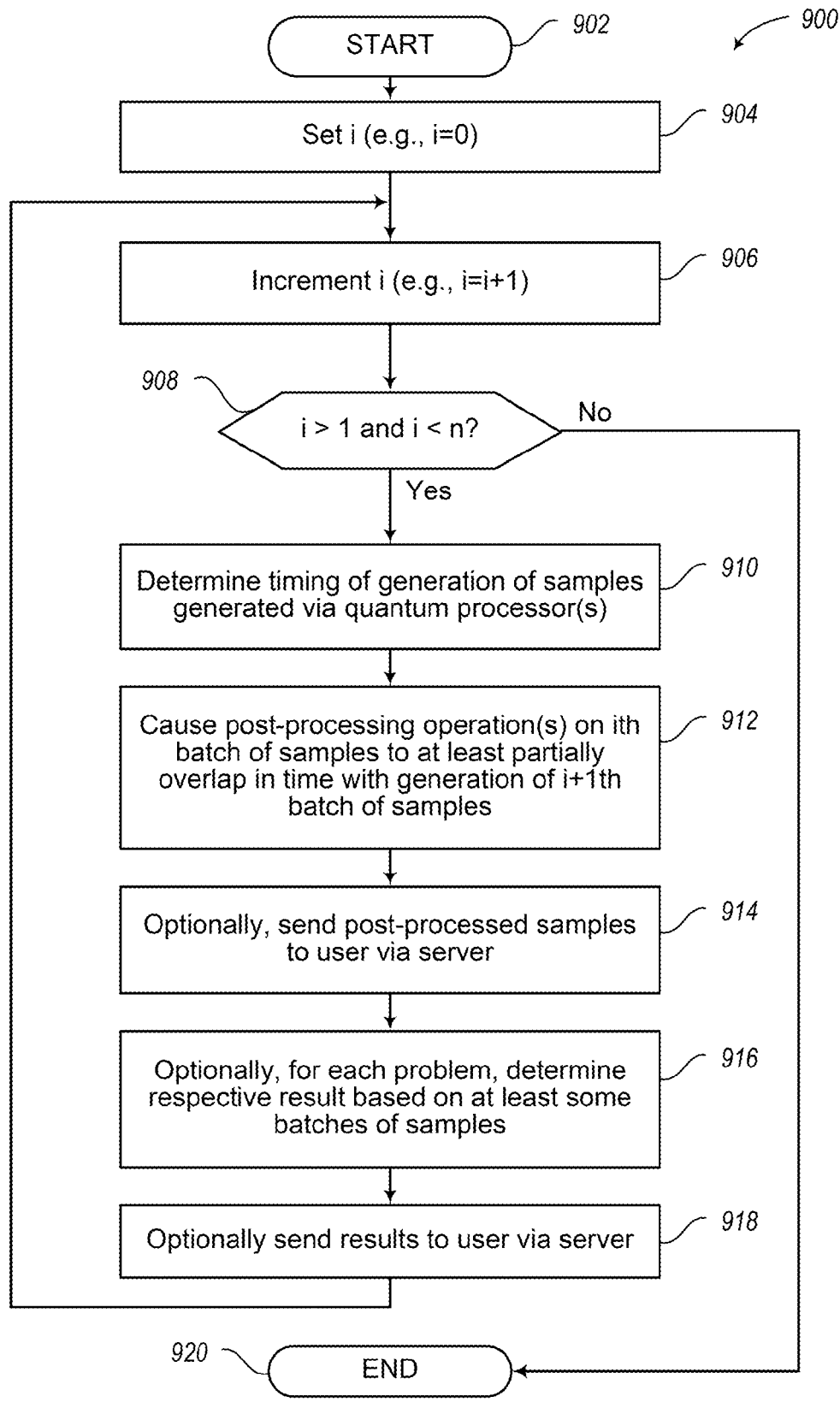
FIG. 9 is a flow diagram showing a high-level method of operation in a computational system to coordinate or overlap execution of post-processing with processing operations in accordance with the presently described systems, devices, articles and methods.

FIG. 9 shows a method 900 of operation in a computational system, according to the presently described systems, devices, articles and methods. The computational system may, for example take the form of the computational system illustrated in and described with respect to FIGS. 1-3.

The method 900 starts at 902, for example in response to submission of a problem or in response to an invocation by another routine. The method 900, or portions thereof, may be executed by one or more processor-based components, for example via one or more processor-based controllers of a job manager (e.g., job manager instructions or software module 306 illustrated in FIGS. 3A and 3B), which is communicatively coupled to one or more heuristic optimizers or solvers and post-processors implemented via appropriate hardware circuitry (e.g., quantum processors, non-quantum processors illustrated in FIGS. 1A and 1B).

The method 900 includes an iterative loop, which is executed over a plurality of iterations i, from a starting value (e.g., 0) to a number n, where n is an integer greater than 2. Consequently, at 904, a counter i is set to an initial value (e.g., i=0). At 906, the counter i is incremented (e.g., i=i+1). Alternatively, the counter may be decremented at 906, but is presented in terms of incrementing for ease of discussion.

At 908, at least one processor-based controller determines whether the number of iterations are within a set of boundaries, for example determining whether the counter i is greater than 1 and i is less than n. If within the boundaries (e.g., yes), the control passes to 910. If not within the boundaries, the control passes to 920 where the method 900 may terminate.

At 910, at least one processor-based controller determines a timing of generation of samples (e.g., batches of samples) which are generated via one or more quantum processor(s), for instance one or more superconducting quantum processors designed for AQC and/or quantum annealing.

In many implementations, the at least one processor-based controller will use a timing of generation of the (i+1)th sample in order to synchronize the post-processing of the ith sample to at least partially occurring during the generation of the subsequent sample(s) (i.e., the (i+1)th sample). In other implementations, the at least one processor-based controller may use a timing of generation of other samples, for instance a timing of the generation of the ith sample, in order to synchronize the post-processing of the ith sample to at least partially occurring during the generation of the subsequent sample(s) (i.e., the (i+1)th sample). In such instances, the at least one processor-based controller accounts for a delay between the generation of the ith sample and the (i+1)th sample.

Determining a timing of generation may include determining an amount of time required to generate and/or receive samples, and may be determinable before the processing which generates the samples occurs. An amount of time that is known or determined before the processing may be used to synchronize the timing of the post-processing operations to coordinate the post-processing with the processing in an at least partially overlapping manner. Alternatively or additionally, determining a timing of generation may include detecting the generation and/or receipt of the samples generated via the processing. Determining the timing "on the fly" by detecting the generation or receipt of the samples resulting from the processing may be used to synchronize the timing of the post-processing operations to coordinate the post-processing with the processing in an at least partially overlapping manner. Various approaches to implementing this a priori and posteriori determination of timing are described below, as well as elsewhere herein and/or in the applications which are incorporated by reference herein.

In order to determine the timing of generation of an (i+1)th batch of samples, the at least one processor-based controller may, for example, determine the amount of time generally required to generate and/or return samples for a given quantum processor and/or type of problems or number of samples to be determined. As noted above, this timing may be determined a priori, before the processing by the quantum processor occurs.

Alternatively, in order to determine the timing of generation of an (i+1)th batch of samples, the at least one processor-based controller may, for example, determine this timing posteriori, detecting the generation by and/or receipt of from the processing by the quantum processor.

In order to determine the timing of generation of an (i+1)th batch of samples, the at least one processor-based controller may, for example, determine that the (i+1)th batch of samples has been generated by the at least one quantum processor in order to determine the timing of the generation of the (i+1)th batch of samples generated by the at least one quantum processor.

Alternatively, the at least one processor-based controller may, for example, determine that the ith batch of samples has been generated by the at least one quantum processor in order to determine the timing of the generation of the (i+1)th batch of samples generated by the at least one quantum processor.

Alternatively, the at least one processor-based controller may, for example, determine the timing of the generation of the (i+1)th batch of samples generated by the at least one quantum processor based at least in part on receipt of the ith batch of samples by the at least one processor-based controller.

Alternatively, the at least one processor-based controller may, for example, determine the timing of the generation of the (i+1)th batch of samples generated by the at least one quantum processor based at least in part on receipt of the ith batch of samples by a component of the computational system that is different from the processor-based controller.

Alternatively, the at least one processor-based controller may, for example, determine the timing of the generation of the (i+1)th batch of samples generated by the at least one quantum processor based at least in part on a transmission of at least one signal that causes the generation of the (i+1)th batch of samples by the at least one quantum processor.

Alternatively, the at least one processor-based controller may, for example, determine the timing of the generation of the (i+1)th batch of samples generated by the at least one quantum processor based at least in part on a transmission of at least one signal that causes the generation of the ith batch of samples by the at least one quantum processor, and based on an amount of time required to generate the ith batch of samples by the at least one quantum processor.

At 912, at least one processor-based controller may, for example, cause performance of one or more post-processing operations on an ith batch of samples at least partially overlapping in time with a generation of an (i+1)th batch of samples which are generated via one or more quantum processor(s). For example, the at least one processor-based controller may cause performance of the one or more post-processing operations on the ith samples timed so as to not extend beyond a time during which the (i+1)th batch of samples are generated via the one or more quantum processors. The at least one processor-based controller may, for example send at least one signal that causes the post-processing of the ith batch of samples via at least one processor-based device.

The post-processing operations may, for example include one or more of a majority voting on chains of qubits post-processing operation, a local search to find local optima post-processing operation, or a Markov Chain Monte Carlo simulation at a fixed temperature post-processing operation, via at least one digital processor which executes a corresponding set of instructions or software module. Causing the performing of post-processing operations may, for example, include causing the performance of post-processing operations by one or more of: a microprocessor, a digital signal processor (DSP), a graphical processing unit (GPU), or a field programmable gate array (FPGA), for instance via one or more microprocessors 140, FPGAs 150, DSPs 160, or GPUs 170 (as illustrated in FIGS. 1A and 1B).

Optionally, at 914, a number of post-processed samples are sent to a user, for example via a server sends. The post-processing may be performed before the sending of the post-processed samples to the user.

Optionally at 916, for each of the problems of the plurality of problems, a respective result is determined by at least one processor-based device (e.g., at least one processor-based controller) based at least in part on at least some of the batches of samples generated during the respective iterations for the respective problem. In some instances, the total number of iterations n for a first one of the plurality of problems is different than the total number of iterations n for a second one of the plurality of problems.

Optionally at 918, results are sent to a user, for example via the server, which may forward the results to an end user who submitted the problem.

The method 900 may terminate at 920, for example, until called again.

In some implementations, information can be accumulated over more than one batch. In general, more samples can lead to improved estimation. A post-processing operation may have parameters that can be adapted based on samples, in a feed forward approach.

Figure 10:
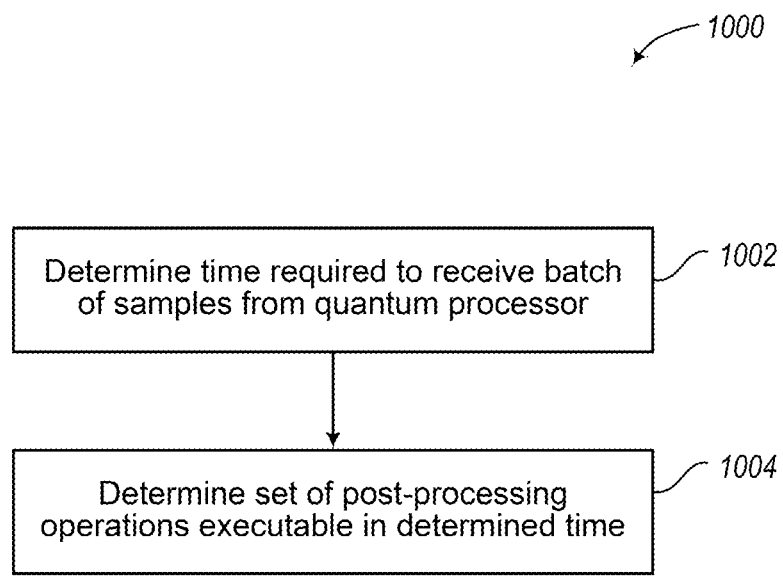
FIG. 10 is a flow diagram showing a low-level method of operation in a computational system to coordinate or overlap execution of post-processing with processing operations in accordance with the presently described systems, devices, articles and methods, which may be executed as part of executing the method of FIG. 9.

FIG. 10 shows a method 1000 of operation in a computational system, according to the presently described systems, devices, articles and methods. The method 1000 may be performed as part of or along with the method 900 (FIG. 9).

The at least one processor-based controller may, for the plurality of iterations i from 2 to n−1, limit a time for performing the at least one post-processing operations to be no greater than a time required to receive the batch of samples from the quantum processor.

At 1002, the at least one processor-based controller determines a time required to receive a batch of samples from the quantum processor. At 1004, the at least one processor-based controller determines a set of post-processing operations executable in the determined time.

FIG. 11 shows a method 1100 of operation in a computational system, according to the presently described systems, devices, articles and methods. The computational system may, for example take the form of the computational system illustrated in and described with respect to FIGS. 1-3.

The method 1100 starts at 1102, for example in response to submission of a problem or in response to an invocation by another routine. The method 1100, or portions thereof, may be executed by one or more processor-based components, for example, via one or more processor-based controllers of a job manager (e.g., job manager instructions or software module 306 illustrated in FIGS. 3A and 3B), which is communicatively coupled to one or more heuristic optimizers or solvers implemented via appropriate hardware circuitry (e.g., quantum processors, non-quantum processors illustrated in FIGS. 1A and 1B).

At 1104, at least one processor-based device performs pre-processing assessment of problem. The pre-processing assessment may include determining a problem type for the particular problem, and determining whether the problem type is a type suitable for solving via the computational system. For instance, the pre-processing assessment may include determining whether the problem is a satisfiability problem or an optimization problem. Optionally at 1105, at least one processor-based device may generate multiple representations of the problem.

At 1106, the at least one processor-based device selects at least one solver (e.g., heuristic optimizer) from a plurality of the solvers (e.g., heuristic optimizers) based at least in part on the pre-processing assessment of the problem. A variety of heuristic optimizers have been discussed in reference to FIGS. 1A, 1B, 2, 3A and 3B. The at least one processor-based device may select any one or more of these heuristic optimizers to solve a particular submitted problem.

The at least one processor-based device may autonomously select at least one heuristic optimizer from a plurality of the heuristic optimizers based at least in part on the assessment of the problem optimizers, without human interaction. For example, the at least one processor-based device may autonomously select at least two heuristic optimizers, different from one another, based at least in part on the assessment of the problem without reference to any user input other than the respective problem and problem type. For instance, the at least one processor-based device may autonomously select at least one heuristic optimizer based at least in part on a prediction, evaluation, consideration, or comparison of how successful each of solvers (e.g., heuristic optimizer) would be on the problem using the extracted features. At 1108, the at least one processor-based device causes the problem to be optimized via the selected one or more heuristic optimizers. Such may, for example, include submitting or sending the problem to the selected one or more heuristic optimizers and/or otherwise invoking the selected one or more heuristic optimizers. The at least one processor-based device may sequentially send the problems, or representations thereof, to two or more solvers (e.g., heuristic optimizers), one solver at a time. Alternatively or additionally, the at least one processor-based device may concurrently send the problems, or representations thereof, to two or more solvers (e.g., heuristic optimizers), two or more at a time.

At 1110, the at least one processor-based device causes a performing of at least one post-processing operation via at least one post-processing processor-based device on a number of samples resulting from the heuristic optimization performed on the problem. For example, the at least one processor-based device may cause at least one post-processing operation via at least one non-quantum processor-based device.

For instance, at least one processor-based device may cause at least one of: one or more microprocessors, one or more digital signal processors (DSPs), one or more graphical processing units (GPUs), and/or one or more field programmable gate arrays (FPGAs) to perform the at least one post-processing operation. The at least one processor-based device receives samples generated via the heuristic optimization executed by the at least one of the microprocessor, the DSP, the GPU, and/or FPGA. In some implementations, the microprocessor(s), DSP(s), GPU(s), and/or FPGA(s) that perform the heuristic optimization may form part of the computational system.

The at least one processor-based device may cause a performing of at least one post-processing operation selected, for example, from: a majority voting on chains of qubits post-processing operation, a local search to find a local optima post-processing operation, or a Markov Chain Monte Carlo simulation at a fixed temperature post-processing operation, via at least one digital processor. The method may employ any of the various post-processing operations or techniques described with respect to FIGS. 1-3, or described elsewhere in this application or the applications incorporated herein by reference.

Additionally or alternatively, the at least one processor-based device may cause one or more quantum processors to perform one or more post-processing operations. For instance, the at least one processor-based device may cause at least one or more superconducting quantum processors designed for AQC (and/or quantum annealing) to perform one or more post-processing operations.

The method 1100 may terminate at 1112, for example until invoked again.

FIG. 12 shows a method 1200 of operation in a computational system, according to the presently described systems, devices, articles and methods. The method 1200 may, for example, be executed as part of the performance or execution of causing execution of a pre-processing of the problem, for instance, the pre-processing assessment operation 1104 of the method 1100 (FIG. 11).

The method 1200 starts at 1202, for instance in response to being invoked by another process or thread.

Optionally at 1204, the at least one processor-based device receives a problem. The problem may, for example, be received either directly or indirectly from an end user or end user device. The problem may, for example, be received via a Web server component or via a job manager component.

At 1206, the at least one processor-based device determines the format of the problem. For example, a job manager component may classify the problem into one or more types or formats, e.g., constraint satisfaction or satisfiability problem, optimization problem, etc. For instance, the job manager component may autonomously classify the problem into one or more types or formats, without human intervention.

At 1208, the at least one processor-based device determines whether determined format of the problem is supported. For example, the at least one processor-based device will compare the type or format of the problem to the resources which are available via the computational system, for instance solvers and/or hardware resources (e.g., non-quantum processors, quantum processors). If the format of the problem is not supported, the at least one processor-based device rejects the problem at 1210, and for example provides a notification or causes a notification of the rejection to be provided at 1212. If the format of the problem is supported, control passes to 1214. For instance, the at least one processor-based device can autonomously determine whether determined format of the problem is supported, without human intervention.

At 1214, the at least one processor-based device generates a number of representations of problem. For example, the at least one processor-based device may generate a QUBO representation of the problem, SAT representation of the problem, graphical model representation of the problem, and/or quadratic assignment representation of the problem. The at least one processor-based device may generate a different representation of the problem that abides by a pre-defined syntax. Again, in at least some implementations, the at least one processor-based device can autonomously generate a number of representations of problem, without human intervention.

The method 1200 may terminate at 1216, for example until invoked again.

FIG. 13 shows a method 1300 of operation in a computational system, according to the presently described systems, devices, articles and methods. The method 1300 may, for example, be executed as part of the performance or execution of causing execution of a pre-processing of the problem, for instance, the pre-processing assessment operation 404 of the method 400 (FIG. 4).

The method 1300 starts at 1302, for instance in response to being invoked by another process or thread.

At 1304, at least one processor-based device extracts feature(s) from representation(s) of problem. For example, from a QUBO problem, the at least one processor-based device may extract relevant features related to graph theory (e.g., size of a graph, number of vertices, maximum and minimum degree of a vertex, etc.). As another example, from a SAT problem, the at least one processor-based device may extract features of clauses (e.g., number of clauses, average size of a clause, number of literals in a clause, etc.). As yet another example, from a graphical model problem, the at least one processor-based device may extract features related to dependencies or relations.

At 1306, the at least one processor-based device assesses a plurality of solvers based at least in part on extracted features. The at least one processor-based device may, for example, employ a lookup table, mapping or database relationship between solvers and extracted features and/or problem formats or types.

At 1308, the at least one processor-based device autonomously selects one or more solvers based on assessment by the processor-based device, without human intervention. In some implementations, at least two solvers are selected, and the two selected solvers are different from one another. Alternatively, in some implementations, the solver(s) may be manually selected based on user input which indicates one or more solvers to be employed on a particular problem.

At 1310, the at least one processor-based device causes a selection of one or more solvers to operate on representation(s) of problem. Such may include forwarding the problem representations to the selected one or more solvers, and/or otherwise invoking the selected one or more solvers.

The method 1300 may be repeated for each of the representations of problem. The method 1300 may terminate at 1312, for example until invoked again by another process or thread.

FIG. 14 shows a method 1400 of operation in a computational system, according to the presently described systems, devices, articles and methods. The method 1400 may, for example, be executed as part of the performance or execution of causing execution of a post-processing of the problem, for instance the post-processing assessment operation 410 of the method 400 (FIG. 4).

At 1402, at least one processor-based device compares the results from each of the selected solvers. For example, the at least one processor-based device compares the results from each of at least two selected solvers. For instance, the at least one processor-based device may compare the final results for respective ones of two or more selected solvers for the respective problem. The at least one processor-based device may employ any of a large variety of post-processing techniques for comparing the results, for instance various post-processing techniques described with respect to FIGS. 1-3, or described elsewhere herein and/or in applications incorporated herein by reference.

At 1404, the at least one processor-based device determines a best solution based at least in part on comparison. Again, the processor-based device may employ any of a large variety of post-processing techniques to determine a best solution, for instance various post-processing techniques described with respect to FIGS. 1-3, or described elsewhere herein and/or in applications incorporated herein by reference.

At 1406, the at least one processor-based device returns the determined best solution to user via network interface. For example, the results may be returned via a Web server, which may implement a Web portal to the problem solving services.

FIG. 15 shows a method 1500 of operation in a computational system, according to the presently described systems, devices, articles and methods. The method 1500 may, for example, be executed as part of the performance or execution of causing selected one or more solvers to operate on representation(s) of problem 1310 of the method 1300 (FIG. 13). The method 1500 may be repeated for each of the selected solvers.

Optionally at 1502, at least one processor-based device splits the problem into portions. The portions may be sized or otherwise configured to allow solvers to effectively operate on the sub-problems. For example, the portions may be sized or otherwise configured to allow an effective embedding of the sub-problem given the particular solver and solver hardware resources.

At 1504, the at least one processor-based device distributes the portions to respective ones of a plurality of computational resources. For example, the at least one processor-based device may distribute the portions or sub-problems to respective ones of a plurality of computational resources based on a type of processing required by the respective portion of the problem.

At 1506, the at least one processor-based device generates a final result for each respective solver for the respective problem based on the results from the portions or sub-problems.

FIG. 16 shows a method 1600 of operation in a computational system, according to the presently described systems, devices, articles and methods. The method 1600 may, for example, be executed as part of the performance or execution of causing selected one or more solvers to operate on representation(s) of problem 1310 of the method 1300 (FIG. 13).

At 1602, at least one processor-based device gathers results of each portion of the respective problem.

At 1604, the at least one processor-based device combines the gathered results of each portion of the respective problem to generate final result for the respective solver for the respective problem.

A benefit of the above described method(s), process(es), or technique(s) is a speed-up in quantum annealing to achieve the same results, or improved results achievable in the same time. For example, a sampler can be used in a sub-optimal mode, and combined with post-processing. The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the commonly assigned US patent application publications, US patent applications, foreign patents, and foreign patent applications referred to in this specification and/or listed in the Application Data Sheet, including but not limited to commonly assigned:

U.S. Pat. No. 7,303,276;

U.S. patent application Ser. No. 14/173,101, filed Feb. 5, 2014, now patent application publication no., 2014-0223224;

International patent application Serial No. PCT/US2014/014836, filed Feb. 5, 2014, now WIPO publication number WO2014123980;

U.S. patent application Ser. No. 14/339,289, filed Jul. 23, 2014, now US Patent Application Publication 2015-0032993;

U.S. patent application Ser. No. 14/340,303, filed Jul. 24, 2014, now patent application publication no., 2015-0032994;

U.S. provisional patent application Ser. No. 61/858,011, filed Jul. 24, 2013;

U.S. provisional patent application Ser. No. 62/040,643, filed Aug. 22, 2014, titled: SYSTEMS AND METHODS FOR PROBLEM SOLVING VIA SOLVERS EMPLOYING PROBLEM MODIFICATION;

U.S. provisional patent application Ser. No. 62/040,646, filed Aug. 22, 2014, titled: SYSTEMS AND METHODS FOR PROBLEM SOLVING VIA SOLVERS EMPLOYING POST-PROCESSING THAT OVERLAPS WITH PROCESSING;

U.S. provisional patent application Ser. No. 62/040,661, filed Aug. 22, 2014, titled: SYSTEMS AND METHODS FOR PROBLEM SOLVING VIA SOLVERS EMPLOYING SELECTION OF HEURISTIC OPTIMIZER(S); and U.S. provisional patent application Ser. No. 62/040,890, filed Aug. 22, 2014, titled: Systems and methods for improving the performance of a quantum processor by correcting to reduce intrinsic/control errors; and U.S. provisional patent application Ser. No. 62/048,043, filed Sep. 9, 2014, titled: Systems and Methods for Improving the Performance of a Quantum Processor via Reduced Readouts, each of which is incorporated herein by reference, in their entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a computational system, the method comprising:
  receiving a problem; and
  for a number of iterations i to a number n where n is a positive integer:
    causing a solver to be executed by at least one processor to generate a plurality of samples as potential solutions to the problem;
    causing, by at least one controller, a performing of at least one post-processing operation on the plurality of samples by at least one post-processing non-quantum processor-based device to generate a set of post-processing results;
    determining whether to modify the problem based at least in part on the set of post-processing results;
    upon determining to modify the problem based at least in part on the set of post-processing results, the $i^{th}$ iteration further comprising:
    causing the problem to be modified; and
    initiating an $(i+)^{th}$ iteration.

2. The method of claim 1 wherein causing a solver to be executed by at least one processor to generate a plurality of samples as potential solutions to the problem includes causing the problem to be optimized by at least one heuristic optimizer executed by at least one processor to generate a plurality of samples as potential solutions to the problem.

3. The method of claim 2 wherein determining whether to modify the problem based at least in part on the set of post-processing results includes at least one of comparing a result to a determined satisfaction condition or comparing the number of iterations performed to a determined limit.

4. The method of claim 2 wherein the at least one processor is a quantum processor.

5. The method of claim 4 wherein causing a performing of at least one post-processing operation by at least one non-quantum processor-based device includes causing a performing of at least one of: a majority voting post-processing operation, a greedy descent post-processing operation, a variable clamping post-processing operation, a variable branching post-processing operation, a local field voting post-processing operation, a local search to find a local minimum post-processing operation, a Markov Chain Monte Carlo simulation at a fixed temperature post-processing operation, and a Metropolis sampling post-processing operation, by at least one digital processor.

6. The method of claim 4 wherein on a first iteration, causing the problem to be optimized by at least one heuristic optimizer executed by at least one processor includes, causing the problem to be optimized by a first heuristic optimizer executed by at least one processor, and on a second iteration, causing the problem to be optimized by at least one heuristic optimizer executed by at least one processor includes, causing the problem to be optimized by a second heuristic optimizer executed by at least one processor, wherein the second heuristic optimizer is different from the first heuristic optimizer.

7. The method of claim 4, wherein causing the problem to be optimized by at least one heuristic optimizer includes
  autonomously selecting, by at least one component of the computational system, a heuristic optimizer from a plurality of types of heuristic optimizers.

8. The method of claim 4 wherein n is an integer greater than 2, and the performing of at least one post-processing operation on the $i^{th}$ plurality of samples by the at least one post-processing non-quantum processor-based device to generate the $i^{th}$ set of post-processing results occurs at least partially overlapping in time with the optimization by at least one heuristic optimizer executed by at least one processor to generate the $(i+1)^{th}$ plurality of samples, for values of i between 2 and (n−1).

9. The method of claim 8 wherein the performing of the at least one post-processing operation on the $i^{th}$ plurality of samples by the at least one post-processing non-quantum processor-based device to generate the $i^{th}$ set of post-processing results does not extend in time beyond the optimization by at least one heuristic optimizer executed by at least one processor to generate the $(i+1)^{th}$ plurality of samples.

10. The method of claim 4 wherein n is an integer greater than 2, and for iterations having values of i between 2 and (n−1), the method further comprising determining a timing of the optimization by at least one heuristic optimizer executed by at least one processor to generate the $(i+1)^{th}$ plurality of samples, wherein the performing of at least one post-processing operation on the $i^{th}$ plurality of samples by the at least one post-processing non-quantum processor-based device to generate the $i^{th}$ set of post-processing results occurs at least partially overlapping in time with the optimization by at least one heuristic optimizer executed by at least one processor to generate the $(i+1)^{th}$ plurality of samples.

11. The method of claim 4 further comprising:
performing a pre-processing assessment of the problem by a processor-based device; and
selecting, by the processor-based device, at least one heuristic optimizer from a plurality of heuristic optimizers based at least in part on the pre-processing assessment of the problem.

12. The method of claim 11 wherein receiving the problem includes:
determining a format of the problem; and
determining whether the determined format of the problem is a supported format, and the method further cormrising;
rejecting the problem in response to determining that the determined format of the problem is not supported; and
providing a notification of the rejection of the problem to a user by at least one component of the computational system.

13. The method of claim 12, further comprising:
in response to the format of the problem being supported, generating a plurality of representations of the problem by the processor-based device;
for each of the representations of the problem,
extracting a number of features from the problem;
at least one of assessing or evaluating each of a plurality of heuristic optimizers based at least in part on the extracted features;
selecting one or more heuristic optimizers based on at least one of the evaluation or the assessment by the processor-based device; and
causing the selected one or more heuristic optimizers to operate on the problem.

14. The method of claim 13 wherein selecting one or more heuristic optimizers based on the evaluation by the processor-based device includes autonomously selecting one or more heuristic optimizers based on at least one of the assessment or the evaluation by the processor-based device.

15. The method of claim 13 wherein evaluating each of a plurality of heuristic optimizers based at least in part on the extracted features includes predicting how successful each of the heuristic optimizers of the plurality of heuristic optimizers would be in returning an optimal solution for the problem using the extracted features.

16. The method of claim 13 wherein at least two heuristic optimizers are selected, the at least two heuristic optimizers different from one another, and further comprising:
comparing the results from each of the selected at least two heuristic optimizers; and
determining a preferred solution based at least in part on the comparison.

17. A computational system, comprising:
at least one processor-based controller, the at least one processor-based controller communicatively coupled to at least one heuristic optimizer which in operation for each of one or more iterations generates a plurality of samples as potential solutions of a problem, the at least one heuristic optimizer executed by at least one processor, the at least one processor-based controller operatively coupled to at least one non-quantum post-processing processor-based device, the at least one processor-based controller which in use for each of the one or more iterations:
causes an execution of at least one post-processing operation on the plurality of samples by the at least one post-processing processor-based device to generate a set of post-processing results;
determines whether to modify the problem based at least in part on the set of post-processing results;
upon determining to modify the problem based at least in part on the set of post-processing results, causes the problem to be modified and initiates a further iteration.

18. The computational system of claim 17 wherein the at least one processor-based controller causes the iterations to cease for the problem in response to determining the result meets a determined satisfaction condition or the number of iterations equals a determined limit.

19. The computational system of claim 17 wherein the at least one processor that executes the heuristic optimizer is a quantum processor.

20. The computational system of claim 19 wherein an execution of at least one post-processing operation on the plurality of samples by the at least one post-processing processor-based device to generate a set of post-processing results includes execution of at least one of: a majority voting post-processing operation, a greedy descent post-processing operation, a variable clamping post-processing operation, a variable branching post-processing operation, or a local field voting post-processing operation.

21. The computational system of claim 19 wherein the at least one heuristic optimizer includes a first optimizer caused by the at least one processor-based controller of the computational system to optimize the problem on a first iteration, and a second heuristic optimizer, different from the first heuristic optimizer, caused by the at least one processor-based controller of the computational system to optimize the problem on a second iteration.

22. The computational system of claim 19 wherein the at least one processor-based controller in use for at least one of the one or more iterations causes the execution of the at least one post-processing operation on the plurality of samples by the at least one post-processing processor-based device to generate a set of post-processing results to at least partially overlap in time with the generation of an immediately subsequent plurality of samples by at least one heuristic optimizer.

23. A computational system, comprising:
at least one processor-based device which includes:
at least one processor; and
at least one nontransitory processor-readable medium communicatively coupled to the at least one processor and which stores at least one of processor-executable instructions or data, and which when executed by the at least one processor causes the at least one processor, for each of a number of problems to:
perform a pre-processing assessment of the problem by a processor-based device;
select, by the processor-based device, at least one heuristic optimizer from a plurality of heuristic optimizers based at least in part on the pre-processing assessment of the problem; and
cause the problem to be optimized by the at least one selected heuristic optimizer.

24. The computational system of claim 23 wherein the at least one processor is a quantum processor.

* * * * *